(12) United States Patent
Leleannec et al.

(10) Patent No.: US 10,735,732 B2
(45) Date of Patent: Aug. 4, 2020

(54) METHOD AND APPARATUS FOR ENCODING AND DECODING A VIDEO

(71) Applicant: InterDigital VC Holdings, Inc., Wilmington, DE (US)

(72) Inventors: Fabrice Leleannec, Mouazé, (FR); Tangi Poirier, Thorigne-Fouillard (FR); Thierry Viellard, Osse (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/336,439

(22) PCT Filed: Oct. 5, 2017

(86) PCT No.: PCT/EP2017/075326
§ 371 (c)(1),
(2) Date: Mar. 25, 2019

(87) PCT Pub. No.: WO2018/065511
PCT Pub. Date: Apr. 12, 2018

(65) Prior Publication Data
US 2019/0281299 A1    Sep. 12, 2019

(30) Foreign Application Priority Data

Oct. 5, 2016  (EP) .................................... 16306309

(51) Int. Cl.
*H04N 19/122* (2014.01)
*H04N 19/176* (2014.01)
(Continued)

(52) U.S. Cl.
CPC ......... *H04N 19/122* (2014.11); *H04N 19/147* (2014.11); *H04N 19/176* (2014.11); *H04N 19/60* (2014.11); *H04N 19/61* (2014.11)

(58) Field of Classification Search
USPC .................................................... 375/240.18
See application file for complete search history.

(56) References Cited

U.S. PATENT DOCUMENTS 7,292,722 B2   11/2007  Lelescu et al.
2009/0089535 A1  4/2009  Lohmar et al.
(Continued)

FOREIGN PATENT DOCUMENTS

CA       2530187      12/2010
WO    WO9834195       8/1998
(Continued)

OTHER PUBLICATIONS wikipedia.org "Butterfly diagram" retrieved Jul. 4, 2017.
(Continued)

*Primary Examiner* — Behrooz M Senfi
(74) *Attorney, Agent, or Firm* — Brian J. Dorini; Xiaoan Lu

(57) ABSTRACT

Method and apparatus for encoding and decoding a video. A method and an apparatus for encoding a video are disclosed. Such a method comprises, for at least one block having a size N which is not a power of 2 along at least one dimension: —determining (40) a predicted block for said at least one block, —obtaining (41) a residual block from said at least one block and said predicted block, —performing (42) block transform of said residual block, said residual block having a size N, —encoding (43) said transformed residual block. Corresponding method and apparatus for decoding a video are also disclosed.

23 Claims, 11 Drawing Sheets

NxN

N/2xN/2

NxN/2

N/2xN (N/4)xN (3N/4)xN

Nx(N/4)

Nx(3N/4)

Figure 1B:
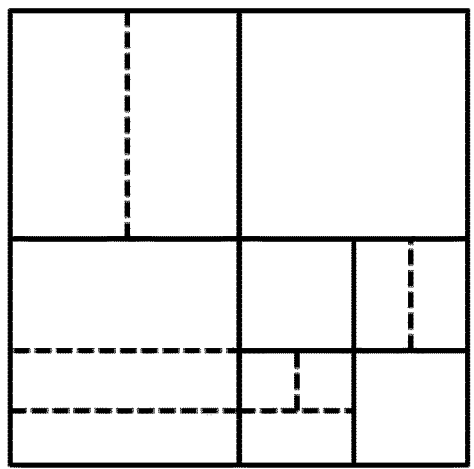

(51) Int. Cl.
  *H04N 19/61* (2014.01)
  *H04N 19/147* (2014.01)
  *H04N 19/60* (2014.01)

(56) References Cited

U.S. PATENT DOCUMENTS

| | | | |
|---|---|---|---|
| 2010/0172409 A1 | 7/2010 | Reznik et al. | |
| 2010/0266008 A1* | 10/2010 | Reznik | G06F 17/147 |
| | | | 375/240.2 |
| 2012/0082212 A1* | 4/2012 | Sadafale | H04N 19/156 |
| | | | 375/240.2 |
| 2013/0083855 A1 | 4/2013 | Kotttke | |
| 2015/0117524 A1 | 4/2015 | Rondao Alface et al. | |
| 2015/0172544 A1 | 6/2015 | Deng et al. | |
| 2016/0012855 A1 | 1/2016 | Krishnan | |
| 2016/0112704 A1 | 4/2016 | Grange et al. | |
| 2018/0041776 A1* | 2/2018 | Kim | H04N 19/176 |
| 2019/0281321 A1* | 9/2019 | Zhao | H04N 19/12 |
| 2019/0306521 A1* | 10/2019 | Zhao | H04N 19/184 |

FOREIGN PATENT DOCUMENTS

| | | |
|---|---|---|
| WO | WO2006016789 | 2/2006 |
| WO | WO2012095317 | 7/2012 |
| WO | WO-2014160943 A1 * | 10/2014 ......... H04N 19/503 |
| WO | WO2016055001 | 4/2016 |

OTHER PUBLICATIONS

Roman Starosolski, "New Simple and Efficient Color Space Transformations for Lossless Image Compression"; Journal of Visual Communication and Image Represent. 25(5) pp. 1056-1063, 2014, Elsevier.

Itu-T H.265 "Series H: Audiovisual and Multimedi Systems Infrastructure of Audiovisual Services—Coding of Moving Video", High Efficiency Video Coding, Apr. 2015.

Junjun Si et al, "Adaptive Rate Control for Hight Efficiency Video Coding", 2012 Visual Communications and Image Processing, Nov. 27-30, 2012, IEEE.

Madhukar Budagavi, "Core Transform Design in the High Efficiency Video Coding HEVC Standard", IEEE Journal of Selected Topics in Signal Processing, vol. 7, No. 6, pp. 1029-1041, Dec. 2013.

Jianle Chen et al., "Algorithm Description of Joint Exploration Test Model 3", May 23-Jun. 1, 2016.

Karsten Suehring, "JVET Common Test Conditions and Software Reference Configurations", Feb. 20-26, 2016.

\* cited by examiner

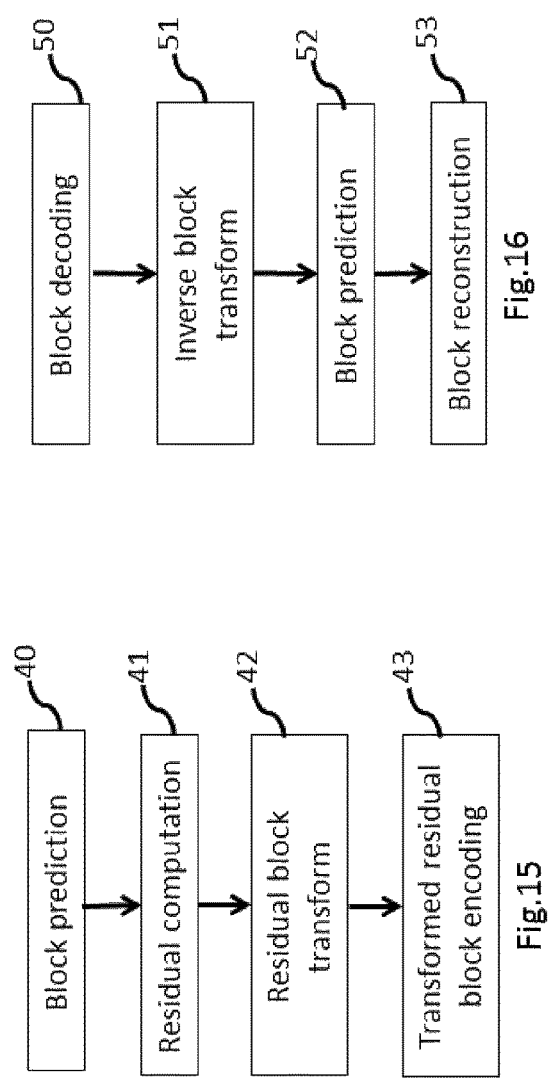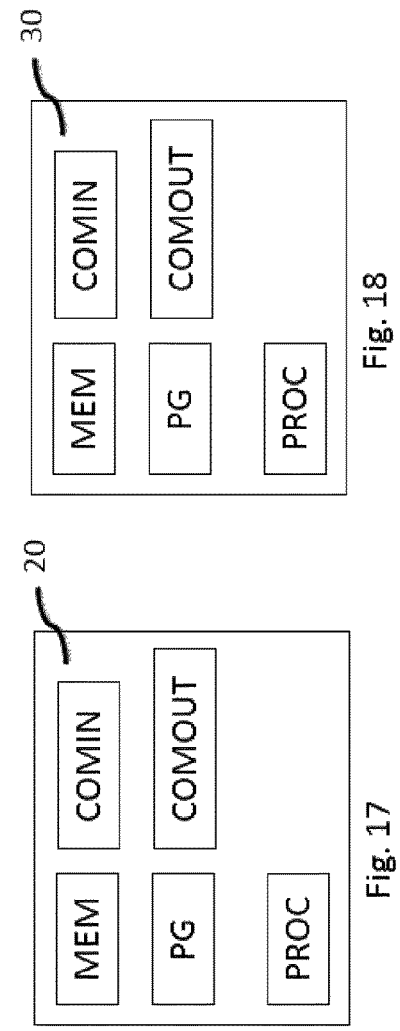

METHOD AND APPARATUS FOR ENCODING AND DECODING A VIDEO

This application claims the benefit, under 35 U.S.C. § 371 of International Application No. PCT/EP17/075326, filed Oct. 5, 2017, which was published on Apr. 12, 2018, which claims the benefit of European Patent Application No. EP16306309.2 filed Oct. 5, 2016.

1. TECHNICAL FIELD

A method and an apparatus for encoding a video into a bitstream are disclosed. Corresponding decoding method and apparatus are further disclosed.

2. BACKGROUND

For coding a picture of a video sequence, video compression methods usually divide the picture into a set of blocks of pixels. Each block is then predicted using information already reconstructed, corresponding to the blocks previously encoded/decoded in the current picture. The coding of a current block is performed using an intra or inter prediction of the current block, and a prediction residual or "residual block" corresponding to a difference between the current block and the predicted block is computed. The resulting residual block is then converted, for example by using a transform such as a DCT (discrete cosine transform) type transform. The coefficients of the transformed residual block are then quantized and encoded by entropy coding and transmitted to a decoder.

In an HEVC video compression standard ("*ITU-T H.265 Telecommunication standardization sector of ITU (10/2014), series H: audiovisual and multimedia systems, infrastructure of audiovisual services-coding of moving video, High efficiency video coding, Recommendation ITU-T H.265*"), a picture is divided into Coding Tree Units (CTU), which size may be 64×64, 128×128 or 256×256 pixels. Each CTU may be further subdivided using a quad-tree division, where each leaf of the quad-tree is called a Coding Unit (CU). Each CU is then given some Intra or Inter prediction parameters. To do so, a CU is spatially partitioned into one or more Prediction Units (PU), a PU may have a square or a rectangular shape. Each PU is assigned some prediction information, such as for example motion information, spatial intra prediction. According to the HEVC video compression standard, each CU may be further subdivided into Transform Units (TU) for performing the transform of the prediction residual. However, only square supports transform are defined in the HEVC video compression standard, as disclosed on FIG. 1A. On FIG. 1A, solid lines indicate CU boundaries and dotted lines indicate TU boundaries.

A Quad-Tree plus Binary-Tree (QTBT) coding tool ("*Algorithm Description of Joint Exploration Test Model 3*", Document JVET-C1001_v3, *Joint Video Exploration Team of ISO/IEC JTC1/SC29/WG11*, 3rd meeting, 26 May-1 Jun. 2015, Geneva, CH) provides a more flexible CTU representation than the CU/PU/TU arrangement of the HEVC standard. The Quad-Tree plus Binary-Tree (QTBT) coding tool consists in a coding tree where coding units can be split both in a quad-tree and in a binary-tree fashion. Such coding tree representation of a Coding Tree Unit is illustrated on FIG. 1B, where solid lines indicate quad-tree partitioning and dotted lines indicate binary partitioning of a CU.

The splitting of a coding unit is decided on the encoder side through a rate distortion optimization procedure, which consists in determining the QTBT representation of the CTU with minimal rate distortion cost. In the QTBT representation, a CU has either a square or a rectangular shape. The size of coding unit is always a power of 2, and typically goes from 4 to 128. The QTBT decomposition of a CTU is made of two stages: first the CTU is split in a quad-tree fashion, then each quad-tree leaf can be further divided in a binary fashion or in a quad-tree fashion, as illustrated on FIG. 1C, where solid lines represent the quad-tree decomposition phase and dotted lines represent the binary decomposition that is spatially embedded in the quad-tree leaves. With the QTBT representation, a CU is not anymore partitioned into PU or TU. With the QTBT representation, the transform of the prediction residual is performed on blocks of size expressed as a power of 2 and existing separable transform and fast implementation of such transform usually used for square blocks can be re-used. However, such a QTBT representation does not allow for asymmetric splitting of a CU.

3. SUMMARY

According to an aspect of the disclosure, a method for encoding a video is disclosed. Such a method comprises, for at least one block having a size N which is not a power of 2 along at least one dimension:

determining a predicted block for said at least one block,
obtaining a residual block from said at least one block and said predicted block,
performing block transform of said residual block, said residual block having a size N,
encoding said transformed residual block.

According to an embodiment, N is a multiple of 3.

According to another embodiment, performing block transform of said residual block comprises at least performing butterfly operations converting from a spatial domain to a transform domain a sample vector of size 3, wherein said butterfly operations implement a transform matrix of size 3×3, said sample vector comprising:

samples of said residual block along said at least one dimension in the case where N equals 3, and
linear combinations of samples of said residual block taken along said at least one dimension in the case where N is higher than 3.

According to another embodiment, said block transform is based on a transform matrix $A_N$ represented by:

$$A_N = \sqrt{\frac{2}{N}} \left( c(k) \times \cos\left( \frac{(2 \times j + 1) \times k\pi}{2 \times N} \right) \right)_{k,j \in [0, N-1]},$$

with k an integer k≥0, $$c(k) = \begin{cases} \frac{1}{\sqrt{2}} & \text{if } k = 0, \\ 1 & \text{if } k > 0 \end{cases}.$$

According to a variant, said method further comprising, for N>3:

performing butterfly operations converting from a spatial domain to a transform domain a sample vector of size N/2, wherein said butterfly operations implement a complementary matrix transform $X_N$ represented by:

$$X_N = \cos\left(\frac{(2j+1)\times(2k+1)\pi}{2N}\right)_{k,j\in[0,N/2]}.$$

This embodiment allows providing a fast implementation of the transform when N is higher than 3. Therefore, computational resources are saved.

According to another embodiment, butterfly operations converting from a spatial domain to a transform domain a sample vector of size 3 are represented by:

$E_1 = x_1 + x_3$, $E_2 = x_1 - x_3$, $t_1 = (E_1 + x_2) \times A_3(1,1)$, $t_2 = E_2 \times A_3(2,1)$, $t_3 = E_1 \times A_3(3,1) - x_2$, where $$\begin{bmatrix} x_1 \\ x_2 \\ x_3 \end{bmatrix}$$

represents said sample vector of size 3 from said spatial domain, $$\begin{bmatrix} t_1 \\ t_2 \\ t_3 \end{bmatrix}$$

represents a resulting sample vector of size 3 from said transform domain, $E_1$ and $E_2$ represent intermediate values for butterfly design used for computing samples from said transform domain, $A_3(k,j)$ represent corresponding values of said transform matrix.

Such an implementation allows reducing the number of multiplications needed for performing the transform of the residual block. Thus, complexity is reduced.

According to another embodiment, butterfly operations converting from a spatial domain to a transform domain a sample vector of size 6, comprises at least the following operations:

$E_1 = X_6(1,1) \times v_1 + X_6(3,1) \times v_3$, $E_2 = X_6(2,1) \times v_2$, $E_3 = X_6(3,1) \times v_1 + X_6(1,1) \times v_3$, $u_1 = E_1 + E_2$ $u_2 = E_1 - E_2 - E_3$ $u_3 = E_2 + E_3$ where $$\begin{bmatrix} v_1 \\ v_2 \\ v_3 \end{bmatrix} = \begin{bmatrix} x_1 - x_6 \\ x_2 - x_5 \\ x_3 - x_4 \end{bmatrix}$$

is obtained from said sample vector of size 6 from said spatial domain, $E_1$, $E_2$ and $E_3$ represent intermediate values for butterfly design further used for computing transformed samples from said transformed residual block, $X_6(k,j)$ represent corresponding values of the complementary matrix transform and $$\begin{bmatrix} u_1 \\ u_2 \\ u_3 \end{bmatrix}$$

is the resulting vector of samples in the transform domain.

According to another embodiment, for N>3, a butterfly implementation of said matrix transform $A_N$ is based on a matrix $P_l(A_N)$ corresponding to a matrix wherein N/2 first lines of $P_l(A_N)$ corresponds to odd lines of $A_N$ and N/2 last lines of $P_l(A_N)$ corresponds to even lines of $A_N$.

According to this embodiment, the butterfly implementation for transforming data of blocks having a size N in at least one dimension which is a multiple of 3 takes advantage of the symmetry which is present in the transform matrix $A_N$. Therefore, a butterfly implementation of the transform matrix for a size N/2 can be re-used for the size N.

According to another embodiment, said matrix $P_l(A_N)$ is represented by:

$$P_l(A_N) = \sqrt{\frac{2}{N}}\left(\begin{array}{cc} \sqrt{\frac{N/2}{2}} \times A_{N/2} & \sqrt{\frac{N/2}{2}} \times \overline{A_{N/2}} \\ X_N & -\overline{X_N} \end{array}\right),$$

where $\overline{A_{N/2}}$ represents a vertically flipped version of the matrix $A_{N/2}$, and $\overline{-X_N}$ represents the opposite of the vertically flipped version of said complementary matrix transform $X_N$.

According to this embodiment, it is thus possible to re-use the butterfly implementation designed for the matrix $A_{N/2}$.

According to another embodiment, the transform process through matrix $P_l(A_N)$ is performed as 2 sub-transforms $A_{N/2}$ and $X_N$, respectively applied on sub-vectors derived from input spatial samples $(x_i + X_{N+1-i})_{i=1, \ldots, N/2}$ and $(x_i - X_{N+1-i})_{i=1, \ldots, N/2}$.

According to a further embodiment, the two sub-transforms are performed through butterfly operations of matrix $A_{N/2}$ applied on a sub-vector $(a_i)_{i=1, \ldots, N/2} = (x_1 + x_{N+1-i})_{i=1, \ldots, N/2}$, leading to a transformed sub-vector $(b_i)_{i=1, \ldots, N/2}$ on one side, and butterfly operations of matrix $X_N$ applied on a sub-vector $(v_i)_{i=1, \ldots, N/2} = (x_i - x_{N+1-i})_{i=1, \ldots, N/2}$ leading to a transformed sub-vector $(u_1)_{i=1, \ldots, N/2}$.

According to a further embodiment, a final transform vector $(t_i)_{i=1, \ldots, N}$ is obtained as an interleaving of said transformed sub-vectors $(b_i)_{i=1, \ldots, N/2}$ and $(u_i)_{i=1, \ldots, N/2}$:
$(t_i)_{i=1, \ldots, N} = (b_1, u_1, b_2, U_2, \ldots, b_{N/2}, u_{N/2})$ According to another aspect of the disclosure, a method for decoding a video is disclosed. Such a method comprises, for at least one block having a size N which is not a power of 2 along at least one dimension:
  decoding a transformed residual block,
  performing inverse block transform of said transformed residual block, said residual block having a size N,
  determining a predicted block for said at least one block,
  reconstructing said at least one block from said inverse transformed residual block and said predicted block.

Thus, the present principle allows performing inverse transformation of a transformed residual block on a support of a same size as the support for prediction. Thus, asymmetric partitioning of blocks can be coupled to fast inverse transformation of data of such blocks, yielding to better compression efficiency and reducing computational complexity.

According to an embodiment, N is a multiple of 3.

According to another embodiment, performing inverse block transform of said transformed residual block comprises at least performing butterfly operations converting from a transform domain to a spatial domain a sample vector of size 3, wherein said butterfly operations implement a transform matrix of size 3×3, said sample vector comprising:
- samples of said transformed residual block along said at least one dimension in the case where N equals 3, and
- linear combinations of samples of said transformed residual block taken along said at least one dimension in the case where N is higher than 3.

According to another embodiment, said inverse block transform is based on a transform matrix $S_N$ represented by:

$$S_N = A_N^t = \sqrt{\frac{2}{N}} \left( c(k) \times \cos\left(\frac{(2 \times j + 1) \times k\pi}{2 \times N}\right) \right)_{j,k \in [0, N-1]},$$

with k an integer k≥0, $$c(k) = \begin{cases} \frac{1}{\sqrt{2}} & \text{if } k = 0, \\ 1 & \text{if } k > 0 \end{cases}.$$

According to another embodiment, butterfly operations converting from a transform domain to a spatial domain a sample vector of size 3 are represented by:

$E_1 = t_1 \times S_3(1,1)$, $E_2 = t_2 \times S_3(1,2)$, $E_3 = t_3 \times S_3(1,3)$, $x_1 = E_1 + E_2 + E_3$, $x_2 = E_1 - t_3$, $x_3 = E_1 - E_2 + E_3$, where $$\begin{bmatrix} x_1 \\ x_2 \\ x_3 \end{bmatrix}$$

represents a resulting sample vector of size 3 from said spatial domain, $$\begin{bmatrix} t_1 \\ t_2 \\ t_3 \end{bmatrix}$$

represents said sample vector of size 3 from said transform domain, $E_1$, $E_2$ and $E_3$ represent intermediate values for butterfly design used for computing samples from said spatial domain, $S_3$ (j,k) represent corresponding values of the transform matrix.

Such an implementation allows reducing the number of multiplications needed for performing the inverse transform of the residual block. Thus, complexity is reduced.

According to another embodiment, said method further comprising, for N>3:
performing butterfly operations converting from a transform domain to a spatial domain a sample vector of size N/2, wherein said butterfly operations implement a complementary matrix transform $X_N$ represented by:

$$X_N = \cos\left(\frac{(2j+1) \times (2k+1)\pi}{2N}\right) k, j \in [0, N/2].$$

This embodiment allows providing a fast implementation of the inverse transform when N is higher than 3. Therefore, computational resources are saved.

According to another embodiment, butterfly operations converting from a transform domain to a spatial domain a sample vector of size 6, are represented by:

$E_1 = X_6(1,1) \times u_1 + X_6(3,1) \times u_3$, $E_2 = X_6(2,1) \times u_2$, $E_3 = X_6(3,1) \times u_1 + X_6(1,1) \times u_3$, $v_1 = E_1 + E_2$ $v_2 = E_1 - E_2 - E_3$ $v_3 = E_2 + E_3$ where $$\begin{bmatrix} u_1 \\ u_2 \\ u_3 \end{bmatrix}$$

represents said sample vector of size 3 from said transform domain, $E_1$, $E_2$ and $E_3$ represent intermediate values for butterfly design further used for computing transformed samples from said transformed residual block, $X_6(k,j)$ represent corresponding values of the complementary matrix transform and $$\begin{bmatrix} v_1 \\ v_2 \\ v_3 \end{bmatrix}$$

is the resulting vector of samples in the spatial domain.

According to another embodiment, said butterfly operations implementing said matrix transform $X_N$ uses linear combinations of columns from said matrix transform $X_N$. This embodiment takes advantage of the properties of the matrix transform $X_N$.

According to another embodiment, for N>3, a butterfly implementation of said matrix transform $S_N$ is based on a matrix $P_c$ ($S_N$) corresponding to a matrix wherein N/2 first column of $P_c(S_N)$ corresponds to odd columns of $S_N$ and N/2 last columns of $P_c(S_N)$ corresponds to even columns of $S_N$.

According to this embodiment, the butterfly implementation for transforming data of blocks having a size N in at least one dimension which is a multiple of 3 takes advantage of the symmetry which is present in the transform matrix $S_N$. Therefore, a butterfly implementation of the transform matrix for a size N/2 can be re-used for the size N.

According to another embodiment, said matrix $P_c(S_N)$ is represented by:

$$P_c(S_N) = \sqrt{\frac{2}{N}} \begin{pmatrix} \sqrt{\frac{N/2}{2}} \times S_{N/2} & X_N \\ \sqrt{\frac{N/2}{2}} \times \widetilde{S_{N/2}} & -\widetilde{X_N} \end{pmatrix},$$

where $\widetilde{S_{N/2}}$ represents an horizontally flipped version of the matrix $S_{N/2}$, and $-\widetilde{X_N}$ represents the opposite of the horizontally flipped version of said complementary matrix transform $X_N$. According to this embodiment, it is thus possible to re-use the butterfly implementation designed for the matrices $X_{N/2}$ and $X_N$.

According to this embodiment, it is thus possible to re-use the butterfly implementation designed for the matrix $S_{N/2}$.

According to another embodiment, the transform process through matrix $P_c(S_N)$ is performed as 2 sub-transforms $S_{N/2}$ and $X_N$, respectively applied on sub-vectors derived from input transform samples $(t_i)_{i=1,\ldots,N/2}$ and $$(t_i)_{i=\frac{N}{2}+1 \ldots N}.$$

According to a further embodiment, the two sub-transforms are performed through butterfly operations of matrix $S_{N/2}$ applied on a sub-vector $(t_i)_{i=1,\ldots,N/2}$, leading to a sub-vector $(a'_i)_{i=1,\ldots,N/2}$ on one side, and butterfly operations of matrix $X_N$ applied on a sub-vector $$(t_i)_{i=\frac{N}{2}+1 \ldots N}$$

leading to a sub-vector $(x'_i)_{i=1,\ldots,N/2}$.

According to a further embodiment, a final inverse transformed vector $(x_i)_{i=1,\ldots,N}$ is obtained by recombining said sub-vectors $(a'_i)_{i=1,\ldots,N/2}$ and $(x'_i)_{i=1,\ldots,N/2}$:

$$(x)_{i=1,\ldots,N} = \left[ (a'_1 + x'_1)(a'_2 + x'_2) \ldots \left(a'_{\frac{N}{2}} + x'_{\frac{N}{2}}\right)(a'_1 - x'_1)(a'_2 - x'_2) \ldots \left(a'_{\frac{N}{2}} - x'_{\frac{N}{2}}\right) \right]^t$$

According to another aspect of the disclosure, an apparatus for encoding a video is disclosed. Such an apparatus comprises, for at least one block having a size N which is not a power of 2 along at least one dimension:
means for determining a predicted block for said at least one block,
means for obtaining a residual block from said at least one block and said predicted block,
means for performing block transform of said residual block, said residual block having a size N,
means for encoding said transformed residual block.

According to another aspect of the disclosure, an apparatus for decoding a video is also disclosed. Such an apparatus comprises, for at least one block having a size N which is not a power of 2 along at least one dimension:
means for decoding a transformed residual block,
means for performing inverse block transform of said transformed residual block, said residual block having a size N,
means for determining a predicted block for said at least one block,
means for reconstructing said at least one block from said inverse transformed residual block and said predicted block.

The present disclosure also provides a computer readable storage medium having stored thereon instructions for encoding a video according to any one of the embodiments described in the disclosure.

The present disclosure also provides a computer readable storage medium having stored thereon instructions for decoding a video according to any one of the embodiments described in the disclosure.

According to one implementation, the different steps of the method for coding a video or decoding a video as described here above are implemented by one or more software programs or software module programs comprising software instructions intended for execution by a data processor of an apparatus for encoding/decoding a video, these software instructions being designed to command the execution of the different steps of the methods according to the present principles.

A computer program is also disclosed that is capable of being executed by a computer or by a data processor, this program comprising instructions to command the execution of the steps of a method for encoding a video or of the steps of a method for decoding a video as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

4. BRIEF DESCRIPTION OF THE DRAWINGS

Figure 1A:
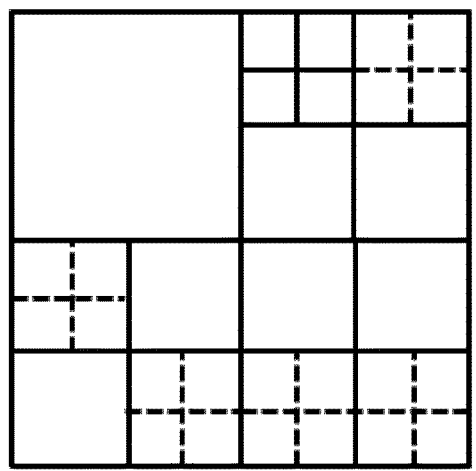
Figure 3:
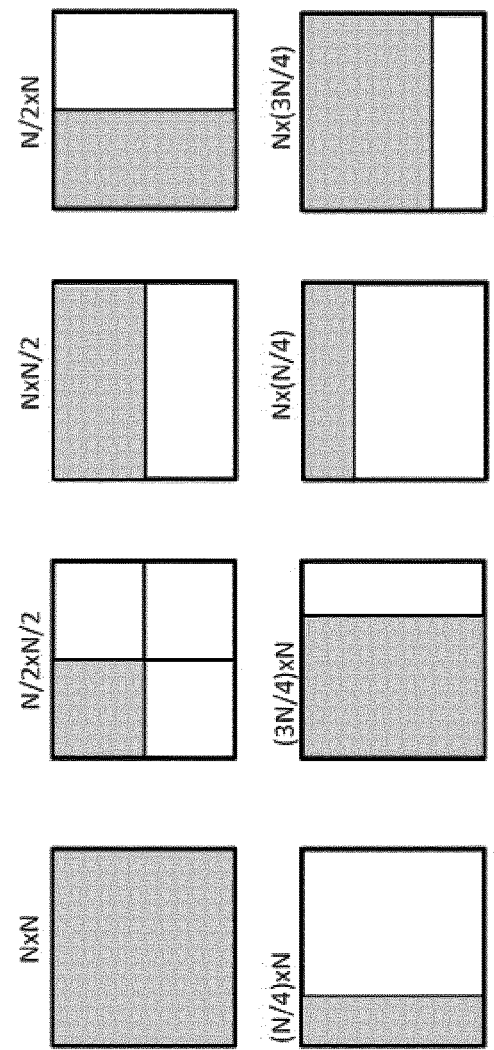
Figure 1C:
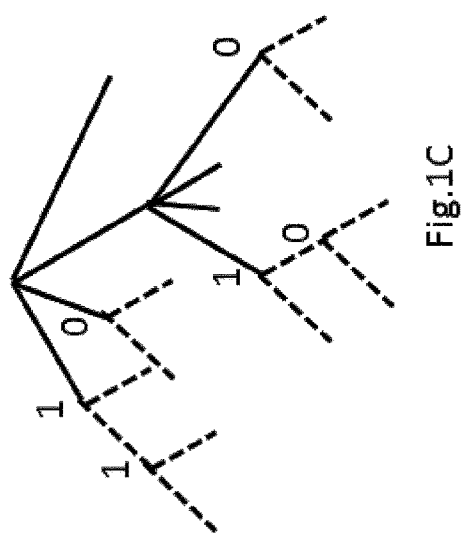
Figure 2:
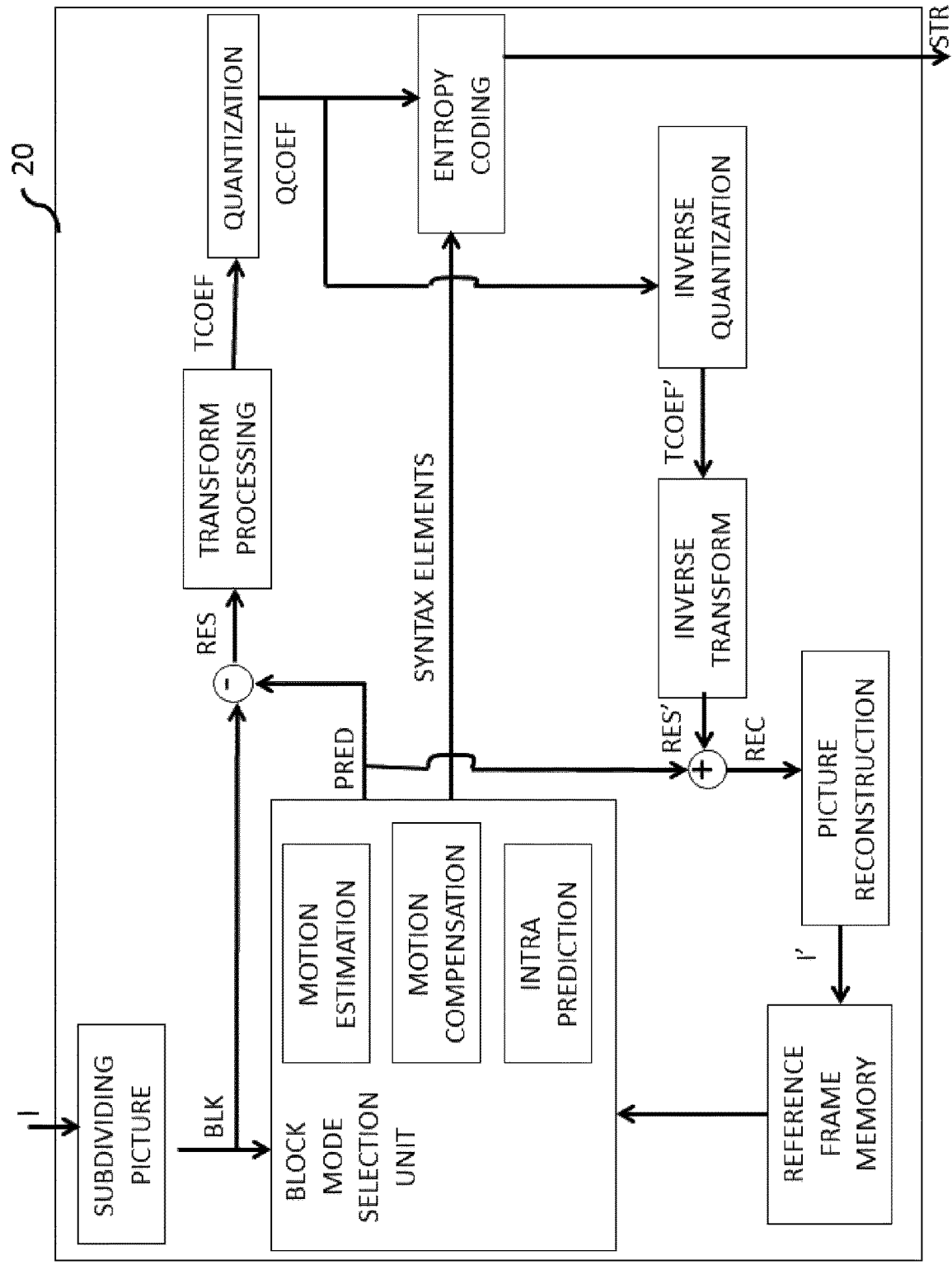
Figure 5:
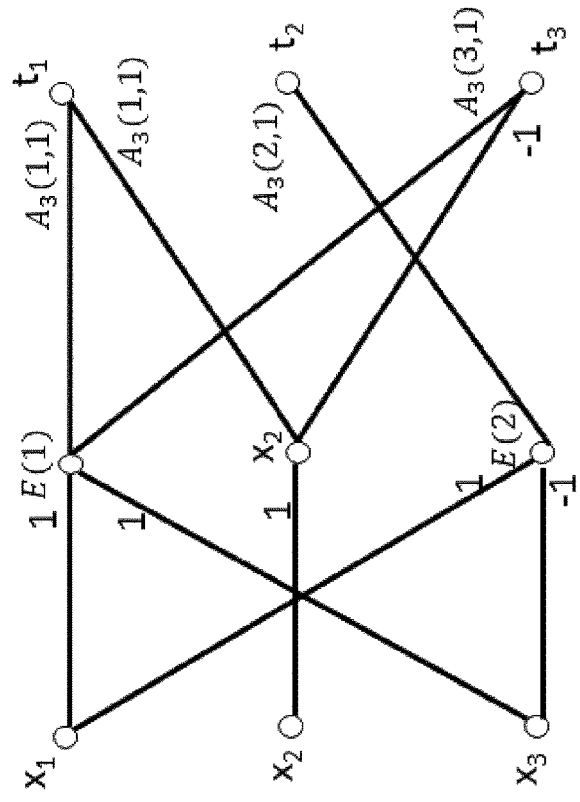
Figure 4:
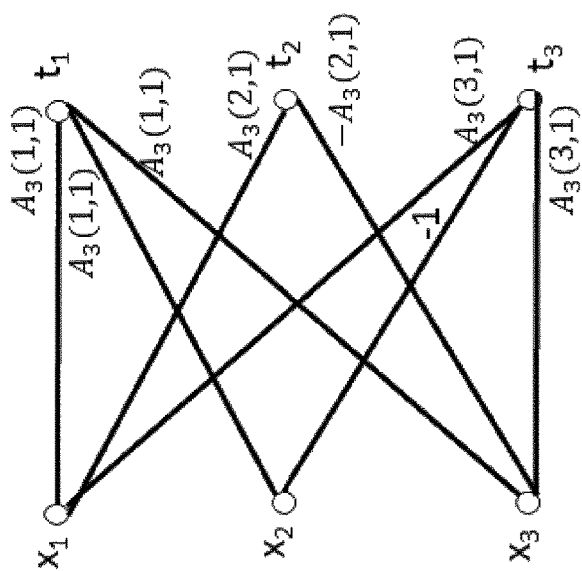
Figure 9:
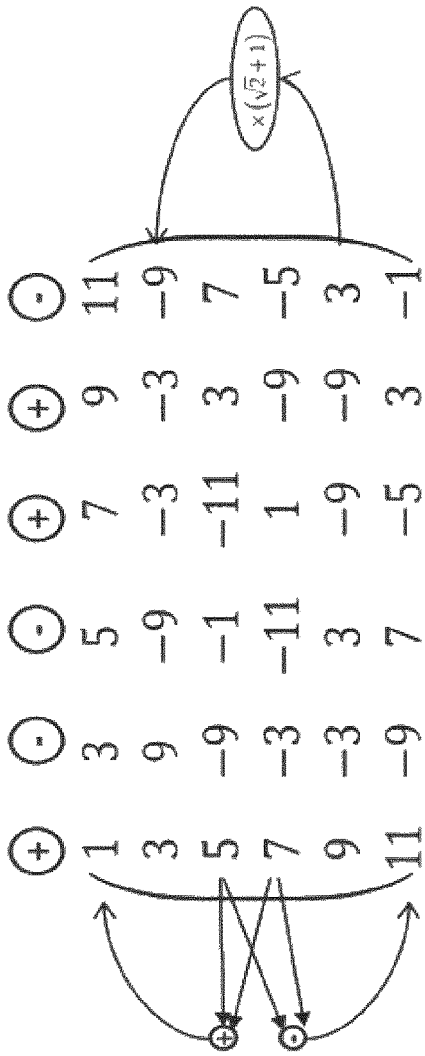
Figure 6:
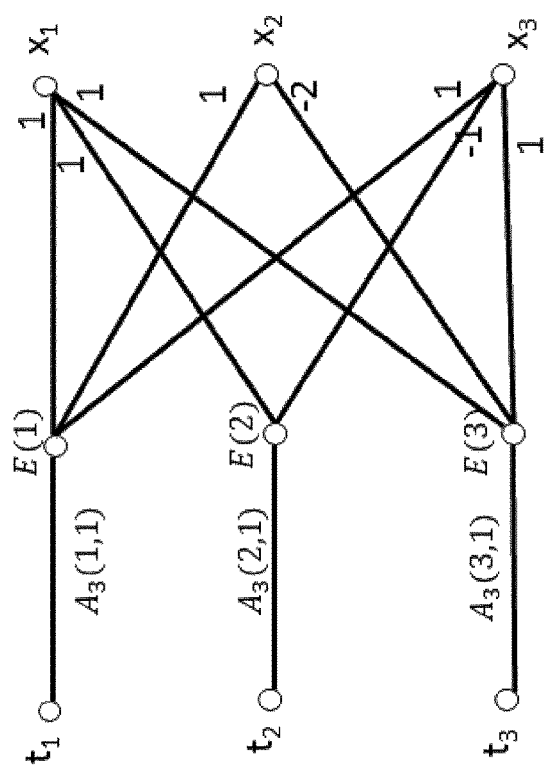
Figure 7:
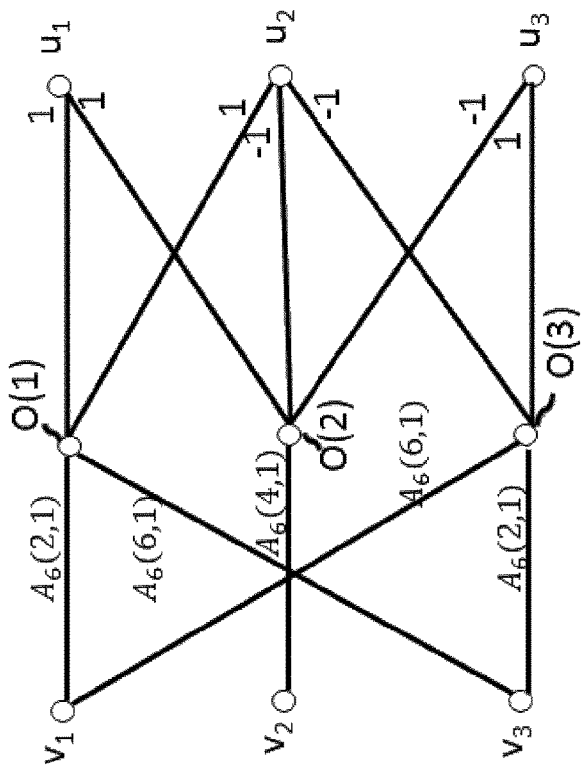
Figure 8:
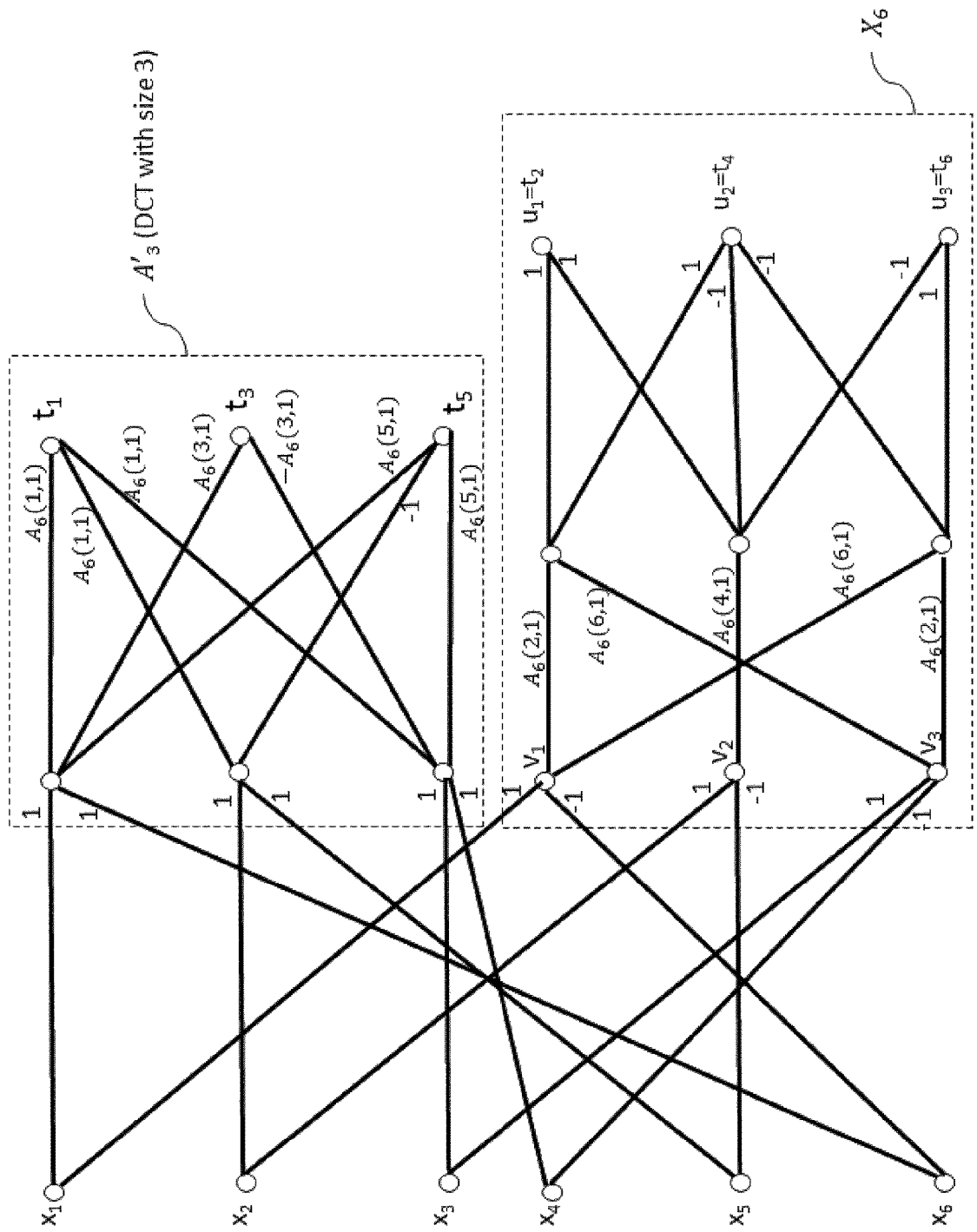

FIG. 1A illustrates an exemplary CTU partitioning into coding units and transform units according to an HEVC video compression standard, FIG. 1B illustrates an exemplary CTU partitioning according to the quad-tree and binary tree based method (QTBT), FIG. 1C illustrates an exemplary tree representation of a CTU partitioning according to the quad-tree and binary tree based method (QTBT), FIG. 2 illustrates a block diagram of an exemplary encoder according to an embodiment of the present principles, FIG. 3 illustrates example of partitioning of a CU into sub-CUs according to the present principles, FIG. 4 illustrates a diagram of a butterfly implementation of a one-dimensional transform with size equal to 3, according to an embodiment of the present principles, FIG. 5 illustrates another diagram of a butterfly implementation of a one-dimensional transform with size equal to 3, according to an embodiment of the present principles, FIG. 6 illustrates a diagram of a butterfly implementation of a one-dimensional inverse transform with size equal to 3, according to an embodiment of the present principles, FIG. 7 illustrates a diagram of a butterfly implementation of a one-dimensional complementary transform with size equal to 3 used for performing a one-dimensional fast transform with size equal to 6, according to an embodiment of the present principles, FIG. 8 illustrates a diagram of a butterfly implementation of a one-dimensional transform with size equal to 6, according to an embodiment of the present principles, FIG. 9 illustrates the relationships between lines and columns of $X_{12}$ exploited in the fast implementation of $X_{12}$.

Figure 10:
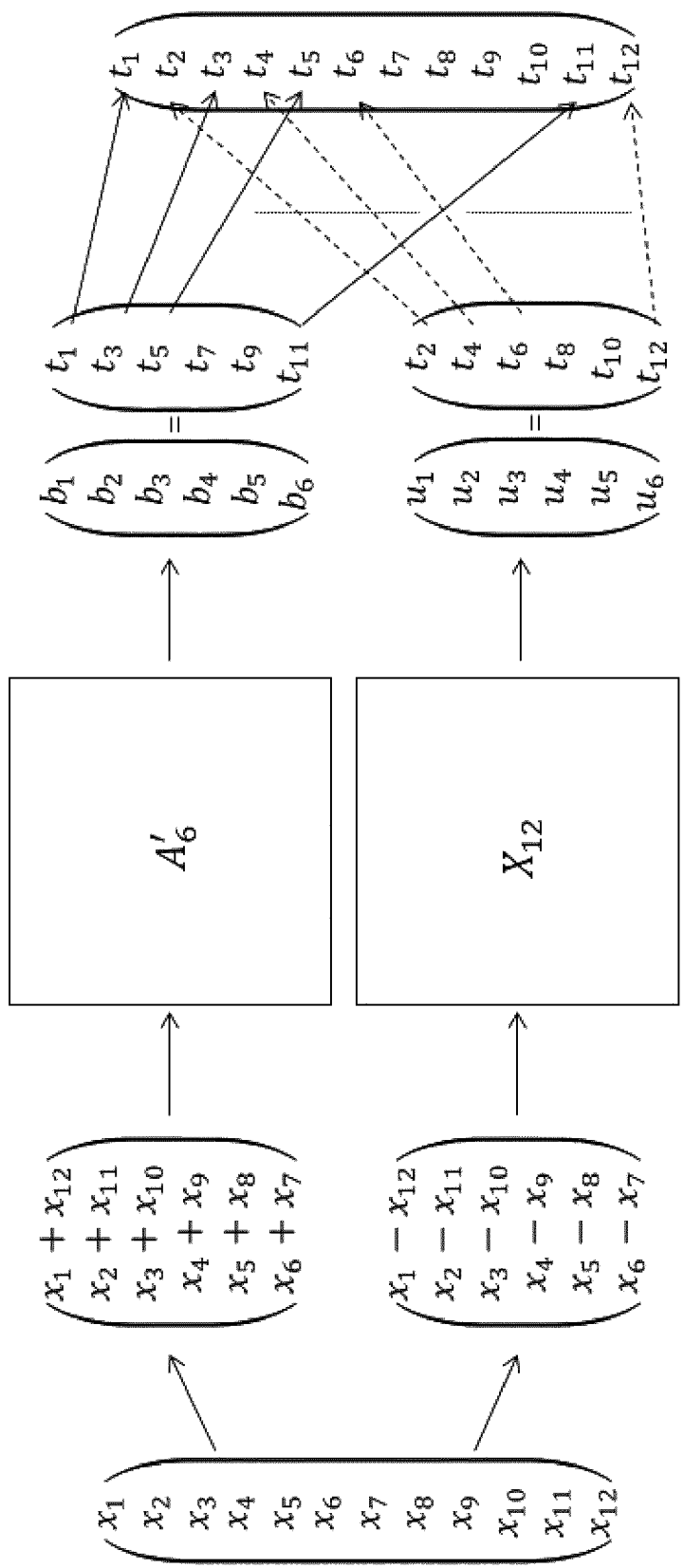
Figure 11:
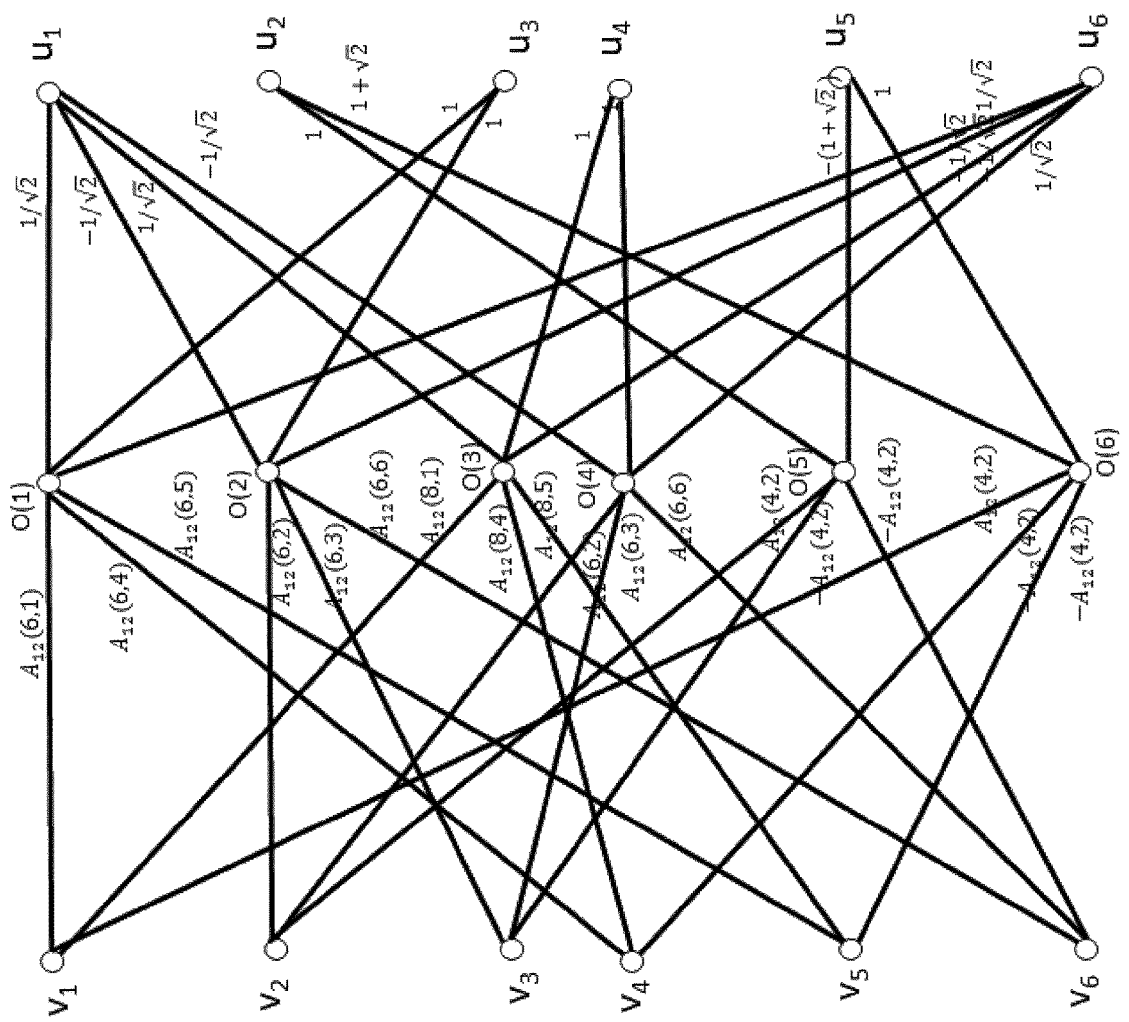
Figure 12:
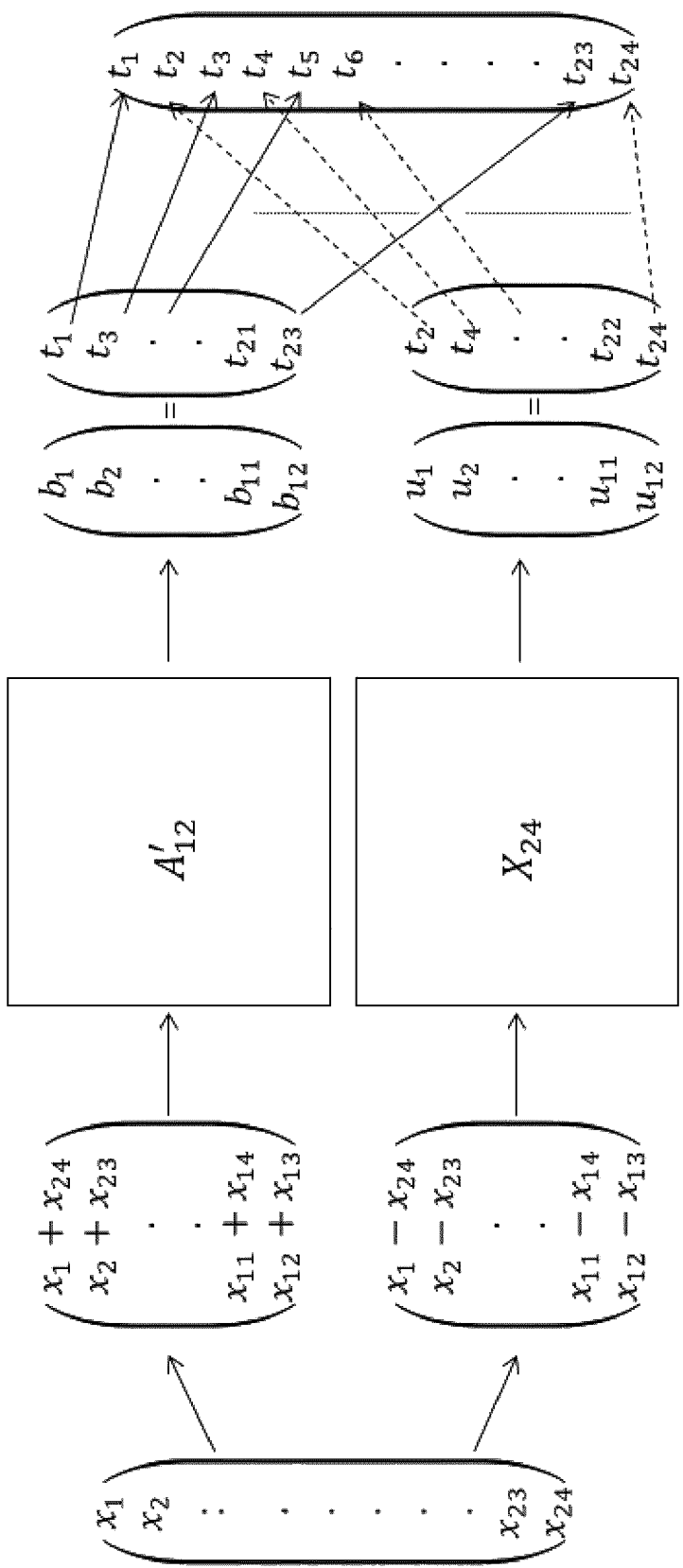
Figure 13:
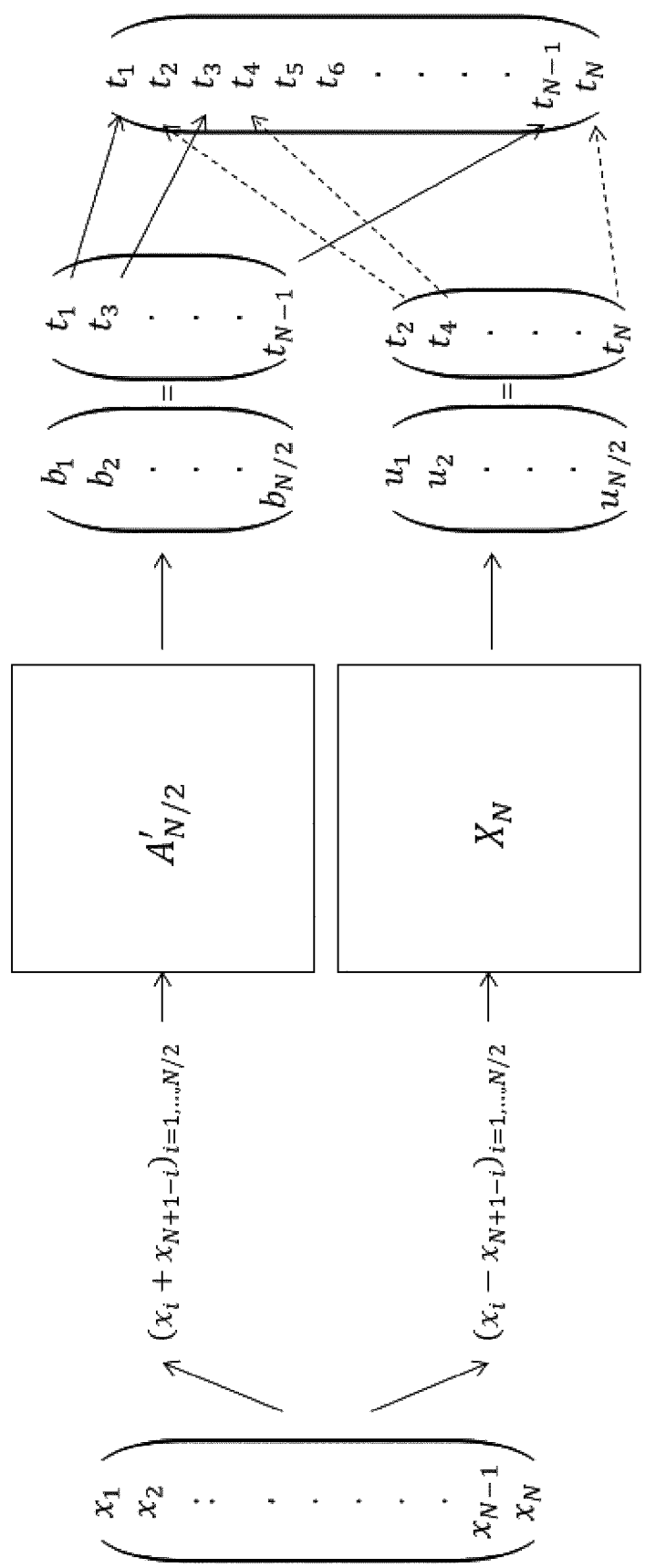
Figure 14:
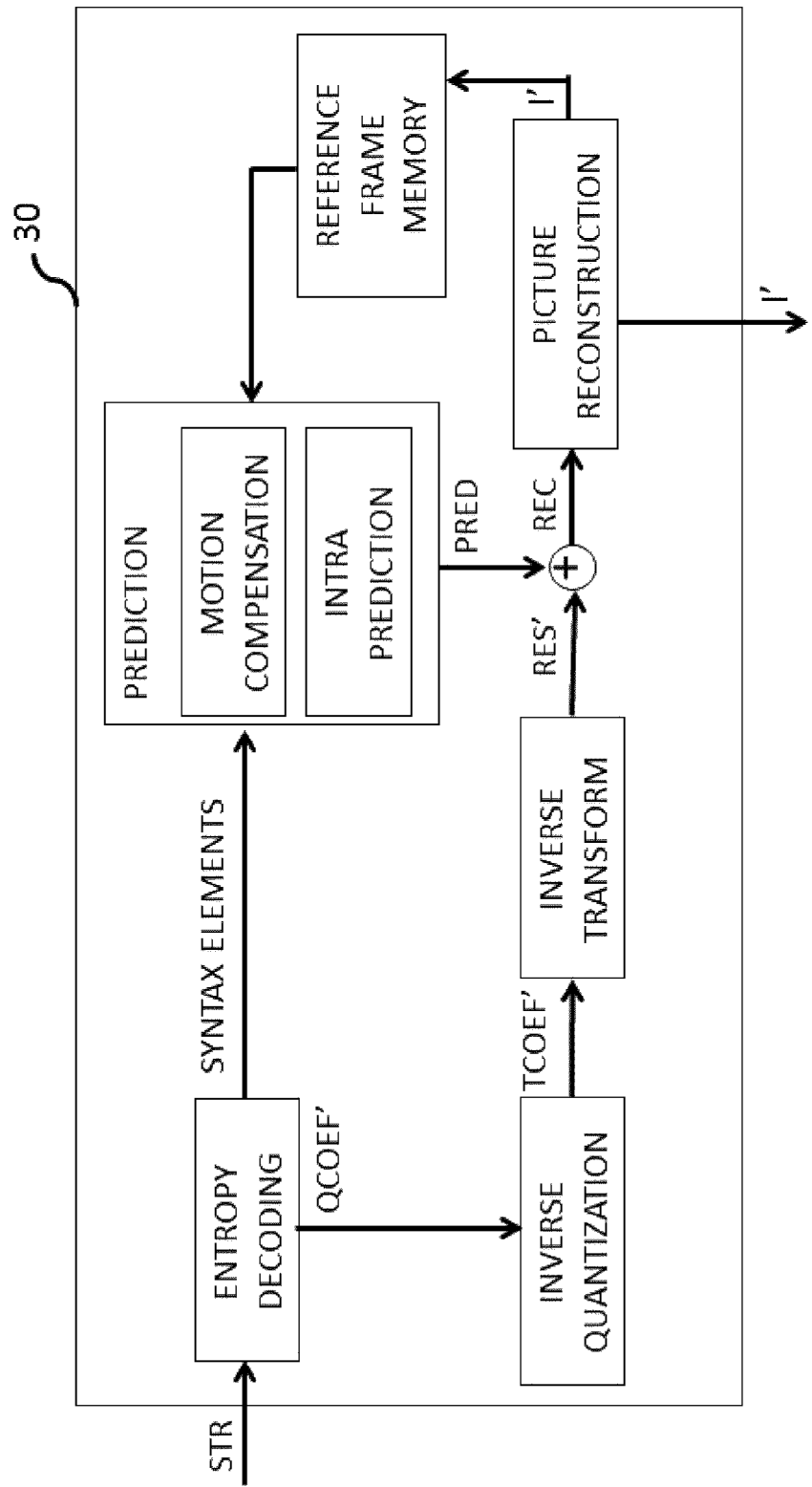

FIG. 10 illustrates a diagram of a one-dimensional transform implementation with size equal to 12 according to an embodiment of the present principles, FIG. 11 illustrates a diagram of a butterfly implementation of a one-dimensional complementary transform with size equal to 6 used for performing a one-dimensional fast transform with size equal to 12, according to an embodiment of the present principles, FIG. 12 illustrates a diagram of a one-dimensional transform implementation with size equal to 24 according to an embodiment of the present principles, FIG. 13 illustrates a diagram of a one-dimensional transform implementation with size equal to N according to an embodiment of the present principles, FIG. 14 illustrates a block diagram of an exemplary decoder according to an embodiment of the present principles, FIG. 15 illustrates a flow diagram of an exemplary method for encoding a video according to an embodiment of the present principles, FIG. 16 illustrates a flow diagram of an exemplary method for decoding a video according to an embodiment of the present principles, FIG. 17 illustrates an exemplary encoder that may be used in one embodiment of the present principles, FIG. 18 illustrates an exemplary decoder that may be used in one embodiment of the present principles.

5. DESCRIPTION OF EMBODIMENTS

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined. A picture is an array of luma samples in monochrome format or an array of luma samples and two corresponding arrays of chroma samples in 4:2:0, 4:2:2, and 4:4:4 colour format. Generally, a "block" addresses a specific area in a sample array (e.g., luma Y), and a "unit" includes the collocated block of all encoded color components (Y, Cb, Cr, or monochrome). However, the term "block" is used herein to refer to a block (e.g. a CB, a CTB) or a unit (e.g. a CU, a CTU).

In the following sections, the word "reconstructed" and "decoded" can be used interchangeably. Usually but not necessarily "reconstructed" is used on the encoder side while "decoded" is used on the decoder side.

FIG. 2 illustrates a block diagram of an exemplary encoder according to an embodiment of the present principles. The video encoder 20 disclosed here below may be conforming to any video or still picture encoding schemes. The encoding and decoding processes described below are for illustration purposes. According to some embodiments, encoding or decoding modules may be added, or removed or may vary from the following modules. However, the principle disclosed herein could still be applied to these variants.

Classically, the video encoder 20 may include several modules for block-based video encoding, as illustrated in FIG. 2. A picture I to be encoded is input to the encoder 20. The picture I is first subdivided into a set of blocks by a subdividing module. Each block BLK of the picture I is then processed for encoding. A block BLK may have size ranging from 4×4 to 128×128 pixels. Usually but not necessarily, the size of a block BLK is a power of 2.

The encoder 20 performs encoding of each block BLK of the picture I as follows. The encoder 20 comprises a mode selection unit for selecting a coding mode for a block BLK of the picture to be coded, e.g. based on a rate/distorsion optimization. Such a mode selection unit comprising:

a motion estimation module for estimating motion between one current block of the picture to be coded and reference pictures, a motion compensation module for predicting the current block using the estimated motion, an intra prediction module for spatially predicting the current block.

The mode selection unit may also decide whether splitting of the block is needed according to rate/distorsion optimization for instance. In that case, the mode selection unit then operates on each subblock of the block BLK. Each subblock of the block BLK may also be further split into subblocks.

Once a coding mode is selected for the current block BLK or coding modes for subblocks of the current block BLK are selected, the mode selection unit delivers a predicted block PRED and corresponding syntax elements to be coded in the bitstream for performing the same block prediction at a decoder. When the current block BLK has been split, the predicted block PRED is formed by the set of predicted subblocks delivered by the mode selection unit for each subblocks.

A residual block RES is then obtained by substracting the predicted block PRED from the original block BLK.

The residual block RES is then transformed by a transform processing module delivering a transform block TCOEF of transformed coefficients. The transform block TCOEF is then quantized by a quantization module delivering a quantized transform block QCOEF of quantized residual transform coefficients.

The syntax elements and quantized residual transform coefficients of the block QCOEF are then input to an entropy coding module to deliver coded data to form the coded bitstream STR.

The quantized residual transform coefficients of the quantized transform block QCOEF are processed by an inverse quantization module delivering a block TCOEF' of unquantized transform coefficients. The block TCOEF' is passed to an inverse transform module for reconstructing a block of residual prediction RES'.

A reconstructed version REC of the block BLK is then obtained by adding the prediction block PRED to the reconstructed residual prediction block RES'.

The reconstructed block REC is stored in memory for use by a picture reconstruction module. The picture reconstruction module performs reconstruction of a decoded version I' of the picture I from the reconstructed blocks REC. The reconstructed picture I' is then stored in a reference picture memory for later use as a reference picture for encoding the following pictures of the set of pictures to code or for encoding subsequent blocks of the picture I.

According to an embodiment of the present principles, when determining a coding mode for coding a block BLK, the block BLK or subblocks of the block BLK may be asymmetrically split as illustrated by FIG. 3. Such splittings result in blocks having rectangular shapes. These shapes consist in sizes equal to $3 \times 2^N$ in width and/or height. Furthermore, a block or subblock having a size multiple of 3 in width or height can be further split in a binary fashion, i.e. horizontally or vertically. As a consequence, a square block of size (w,h), where w is the width of the block, and h is its height, that is split through one of the asymmetric binary splitting modes would lead for example to 2 subblocks with respective rectangular sizes $$\left(w, \frac{h}{4}\right) \text{ and } \left(w, \frac{3h}{4}\right).$$

According to this embodiment, blocks or subblocks having a width and/or height equal to $3 \times 2^N$, may then be determined by the coding mode selection unit and used at the encoder. In such a case, Intra prediction or Inter prediction process is performed on such rectangular blocks or subblocks having of a size multiple of 3.

According to the present principle, the transform processing module is configured to operate on such rectangular shapes by applying a 2D transform with size $3 \cdot 2^n$ in width or height. Such process does not exist in known video coding standards because only square transforms are allowed. According to the present principles, the transform processing module is thus configured to operate on a block having a same shape and size as the shape and size of the prediction block used for predicting the block. Therefore, no more partitioning into transform unit is needed.

The present principle allows providing a fast implementation of the 2D transform to apply on blocks having a size multiple of 3 in at least one dimension (width, height) is disclosed below. According to the present principle, a fast implementation of the 2D inverse transform to apply on blocks having a size multiple of 3 in at least one dimension (width, height) is also disclosed below. The inverse transform module disclosed above is configured to apply such a fast 2D transform to the blocks having a size multiple of 3 in at least one dimension.

The 2D transform applied on a block in standard video codec is a 2D DCT like transform. The 2D DCT applied on a block in standard video codec involves the separable application of two 1D transforms onto the considered 2D block, in horizontal and vertical directions. If we defined the following matrix $A_N$ for a given size N, as follows:

$$A_N = \sqrt{\frac{2}{N}} \left( c(k) \cdot \cos\left(\frac{(2j+1)k\pi}{2N}\right) \right)_{k,j \in [0,N-1]}$$

$$\forall k \geq 0, c(k) = \begin{cases} 1/\sqrt{2} & \text{if } k = 0 \\ 1 & \text{otherwise} \end{cases}$$

Then the 2D separable DCT of an input square block X with size N×N can be written as follows:

$DCT(X) = A_N^t \cdot X \cdot A_N$, with $A_N^t$ being the transposed version of the matrix $A_N$.

Thus it consists in applying the one-dimensional DCT transform successively on each line and each column of the input two-dimensional block.

The one-dimensional DCT transform of a one-dimensional vector $X_N \in \mathbb{R}^N$ is given by:

$$DCT_{1D}(X_N) = A_N \cdot X_N$$

The straightforward implementation of this 1D DCT transform under the form of the multiplication of a matrix by a vector involves N multiplications and N−1 additions, which is a significant amount of operations when the input vector is of large size such as for example 32, 64, 128, 256.

To limit the complexity of integer DCT transform implementation, it is advantageous to design a fast implementation of such transform. A fast implementation of the 1D-DCT transform is disclosed for block sizes equal to $3 \cdot 2^n$, n≥0, i.e. for blocks having a size multiple of 3 in at least one dimension (width, height).

The DCT matrix for a vector size equal to 3 is given by:

$$A_3 = \sqrt{\frac{2}{3}} \left( c(k) \cdot \cos\left(\frac{(2j+1)k\pi}{6}\right) \right)_{k,j \in [0,2]}$$

So, $$A_3 = \begin{bmatrix} A_3(1,1) & A_3(2,1) & A_3(3,1) \\ A_3(1,2) & A_3(2,2) & A_3(3,2) \\ A_3(1,3) & A_3(2,3) & A_3(3,3) \end{bmatrix}$$

can be re-written as:

$$A_3 = \sqrt{\frac{2}{3}} \begin{pmatrix} \frac{1}{\sqrt{2}} & \frac{1}{\sqrt{2}} & \frac{1}{\sqrt{2}} \\ \cos(\frac{\pi}{6}) & 0 & -\cos(\frac{\pi}{6}) \\ \cos(\frac{\pi}{3}) & -1 & \cos(\frac{\pi}{3}) \end{pmatrix} =$$

$$\sqrt{\frac{2}{3}} \begin{pmatrix} c\frac{\pi}{4} & c\frac{\pi}{4} & c\frac{\pi}{4} \\ c\frac{\pi}{6} & 0 & -c\frac{\pi}{6} \\ c\frac{\pi}{3} & -1 & c\frac{\pi}{3} \end{pmatrix} = \sqrt{\frac{1}{3}} \begin{pmatrix} 1 & 1 & 1 \\ \sqrt{3} & 0 & -\sqrt{3} \\ \frac{1}{\sqrt{2}} & -\sqrt{2} & \frac{1}{\sqrt{2}} \end{pmatrix},$$

where $$c\frac{\pi}{i}$$

represents the value of $$\cos\left(\frac{\pi}{i}\right).$$

Butterfly Implementations for Matrix Transform and Inverse Matrix Transform with Size 3

Therefore, a butterfly implementation of the one-dimension DCT with size 3 is shown on FIG. 4.

On FIG. 4, the graph nodes on the left correspond to input samples, and the nodes on the right are the resulting transform DCT coefficients. The values associated with each edge represent a multiplicative factor, which are called edge factors. Moreover, edges that arrive at a same right side node are summed together. Where the same multiplicative factor is applied on some edges that go to same right-side node, then the addition is done before the multiplication by the edge factor.

An equivalent, slightly less compact view of the same butterfly implementation of FIG. 4 is illustrated on FIG. 5.

Therefore, a fast implementation of the 1D DCT with size 3 is as follows:

$E(1) = x_1 + x_3$ $E(2) = x_1 - x_3$ $t_1 = (E(1) + x_2) \times A_3(1,1)$ $t_2 = E(2) \times A_3(2,1)$ $t_3 = E(1) \times A_3(3,1) - x_2,$ where $E(1)$ and $E(2)$ represent intermediate nodes on the butterfly diagram shown on FIG. 5.

Such a butterfly implementation involves 4 additions and 3 multiplications, while a classical matrix-based DCT implementation involves 6 additions and 9 multiplications.

Below, a butterfly diagram for computing the inverse transform 1D DCT with size equal to 3 is shown. The DCT matrix is orthogonal, which implies that the inverse transform matrix $S_3$ can be computed from the transform matrix $A_3$ as follows:

$$S_3 = A_3^{-1} = A_3^t = \sqrt{\frac{2}{3}} \begin{pmatrix} c\frac{\pi}{4} & c\frac{\pi}{6} & c\frac{\pi}{3} \\ c\frac{\pi}{4} & 0 & -1 \\ c\frac{\pi}{4} & -c\frac{\pi}{6} & c\frac{\pi}{3} \end{pmatrix}$$

A butterfly implementation for $S_3$ is shown on FIG. 6. On FIG. 6, terms of matrix A are referred to while $A_3(1,1)=S_3(1,1)$, $A_3(2,1)=S_3(1,2)$ and $A_3(3,1)=S_3(1,3)$.

Therefore, a fast implementation of the 1D inverse DCT with size 3 is as follows:

$E(1) = t_1 \times S_3(1,1)$ $E(2) = t_2 \times S_3(1,2)$ $E(3) = t_3 \times S_3(1,3)$ $x_1 = E(1) + E(2) + E(3)$ $x_2 = E(1) - 2 \times E(3) = E(1) - t_3$ $x_3 = E(1) - E(2) + E(3)$ Such a butterfly implementation involves 5 additions and 3 multiplications, instead of 6 additions and 9 multiplications for the classical matrix-based implementation.

Butterfly Implementations for Matrix Transform and Inverse Matrix Transform with Size 6

Below, butterfly implementations equivalent to matrix transform and inverse matrix transform with a size equal to 6 are disclosed.

The matrix transform corresponding to the 1D DCT with size 6 based on the matrix $A_N$ is as follows:

$$A_6 = \sqrt{\frac{2}{6}} \left( c(k) \cdot \cos\left(\frac{(2j+1)k\pi}{12}\right) \right)_{k,j \in [0,5]}.$$

$A_6$ can also be written as follows:

$$A_6 = \sqrt{\frac{2}{6}} \begin{pmatrix} c\frac{\pi}{4} & c\frac{\pi}{4} & c\frac{\pi}{4} & c\frac{\pi}{4} & c\frac{\pi}{4} & c\frac{\pi}{4} \\ c\frac{\pi}{12} & c\frac{\pi}{4} & c\frac{5\pi}{12} & -c\frac{5\pi}{12} & -c\frac{\pi}{4} & -c\frac{\pi}{12} \\ c\frac{\pi}{6} & 0 & -c\frac{\pi}{6} & -c\frac{\pi}{6} & 0 & c\frac{\pi}{6} \\ c\frac{\pi}{4} & -c\frac{\pi}{4} & -c\frac{\pi}{4} & c\frac{\pi}{4} & c\frac{\pi}{4} & -c\frac{\pi}{4} \\ c\frac{\pi}{3} & -1 & c\frac{\pi}{3} & c\frac{\pi}{3} & -1 & c\frac{\pi}{3} \\ c\frac{5\pi}{12} & -c\frac{3\pi}{12} & c\frac{\pi}{12} & -c\frac{\pi}{12} & c\frac{3\pi}{12} & -c\frac{5\pi}{12} \end{pmatrix}$$

It appears from $A_6$ that the odd lines of $A_6$ comprises the coefficients of $A_3$ discussed above. Therefore, a matrix $P_i$ can be written as follows by permutating lines of $A_6$:

$$P_l(A_6) = \sqrt{\frac{2}{6}} \begin{pmatrix} c\frac{\pi}{4} & c\frac{\pi}{4} & c\frac{\pi}{4} & c\frac{\pi}{4} & c\frac{\pi}{4} & c\frac{\pi}{4} \\ c\frac{\pi}{6} & 0 & -c\frac{\pi}{6} & -c\frac{\pi}{6} & 0 & c\frac{\pi}{6} \\ c\frac{\pi}{3} & -1 & c\frac{\pi}{3} & c\frac{\pi}{3} & -1 & c\frac{\pi}{3} \\ c\frac{\pi}{12} & c\frac{\pi}{4} & c\frac{5\pi}{12} & -c\frac{5\pi}{12} & -c\frac{\pi}{4} & -c\frac{\pi}{12} \\ c\frac{\pi}{4} & -c\frac{\pi}{4} & -c\frac{\pi}{4} & c\frac{\pi}{4} & c\frac{\pi}{4} & -c\frac{\pi}{4} \\ c\frac{5\pi}{12} & -c\frac{3\pi}{12} & c\frac{\pi}{12} & -c\frac{\pi}{12} & c\frac{3\pi}{12} & -c\frac{5\pi}{12} \end{pmatrix},$$

In the matrix $P_l(A_6)$, the first 3 lines correspond to odd lines of $A_6$ and the last 3 lines correspond to even lines of $A_6$.

$P_l(A_6)$ can thus be re-written using $A_3$ and a complementary matrix transform $X_6$, as:

$$P_l(A_6) = \sqrt{\frac{2}{6}} \left( \frac{\sqrt{3/2} \cdot A_3}{X_6} \middle| \frac{\sqrt{3/2} \cdot \overline{A_3}}{-\overline{X_6}} \right) = \sqrt{\frac{2}{6}} \left( \frac{A'_3}{X_6} \middle| \frac{\overline{A'_3}}{-\overline{X_6}} \right),$$

where $\overline{A_3}$ represents a vertically flipped version of the matrix $A_3$, and $X_6$ is defined as follows:

$$X_6 = \begin{pmatrix} A_6(2,1) & A_6(2,2) & A_6(2,3) \\ A_6(4,1) & A_6(4,2) & A_6(4,3) \\ A_6(6,1) & A_6(6,2) & A_6(6,3) \end{pmatrix} = \begin{pmatrix} c\frac{\pi}{12} & c\frac{\pi}{4} & c\frac{5\pi}{12} \\ c\frac{\pi}{4} & -c\frac{\pi}{4} & -c\frac{\pi}{4} \\ c\frac{5\pi}{12} & -c\frac{\pi}{4} & c\frac{\pi}{12} \end{pmatrix}$$

Therefore, the 1D DCT of size 6 applied to a 1D sample vector $$X = \begin{bmatrix} x1 \\ x2 \\ x3 \\ x4 \\ x5 \\ x6 \end{bmatrix} = \begin{bmatrix} Y_1 \\ Y_2 \end{bmatrix}$$

of size 6 with $$Y_1 \begin{bmatrix} x1 \\ x2 \\ x3 \end{bmatrix} \text{ and } Y_1 \begin{bmatrix} x4 \\ x5 \\ x6 \end{bmatrix}$$

can be expressed as follows:

$$P_l(DCT(X)) =$$

$$P_l\left(DCT\begin{bmatrix} Y_1 \\ Y_2 \end{bmatrix}\right) = \sqrt{\frac{2}{6}} \begin{pmatrix} A'_3 \cdot Y_1 + \overline{A'_3} \cdot Y_2 \\ X_6 \cdot Y_1 - \overline{X_6} \cdot Y_2 \end{pmatrix} = \sqrt{\frac{2}{6}} \begin{pmatrix} A'_3 \cdot Y_1 + \overline{A'_3} \cdot Y_2 \\ X_6 \cdot Y_1 - \overline{X_6} \cdot Y_2 \end{pmatrix},$$

with $A'_3 = \sqrt{3/2} \cdot A_3$ and $\overline{A'_3} = \sqrt{3/2} \cdot \sqrt{\overline{A_3}}$, and with $$A'_3 \cdot Y_1 + \overline{A'_3 \cdot Y_2} = A'_3 \cdot (Y_1 + \hat{Y}_2) = A'_3 \cdot \begin{bmatrix} x_1 + x_6 \\ x_2 + x_5 \\ x_3 + x_4 \end{bmatrix} = \begin{bmatrix} t_1 \\ t_3 \\ t_5 \end{bmatrix},$$

$$X_6 \cdot Y_1 - \overline{X_6 \cdot Y_2} = X_6 \cdot (Y_1 - \hat{Y}_2) = X_6 \cdot \begin{bmatrix} x_1 - x_6 \\ x_2 - x_5 \\ x_3 - x_4 \end{bmatrix} = X_6 \cdot v = u,$$

with $\hat{Y}_2$ corresponding to a horizontally flipped version of $Y_2$.

Thus, it appears that computing the 1D DCT of size 6 can be performed by performing the computation of the fast 1D DCT with size 3 disclosed above applied to a linear combination of samples of the input vector X and by performing a fast computation of a product of the matrix $X_6$ by a 3×1 vector comprising linear combination of samples of the input vector X. The application of 1D-DCT with size 3 provides odd lines of the final transform vector, i.e.

$$\begin{bmatrix} t_1 \\ t_3 \\ t_5 \end{bmatrix}$$

Below is disclosed a fast implementation of such multiplication of the matrix $X_6$ by a 3×1 vector $V=[v_1\ v_2\ v_3]^t$, where $[v_1\ v_2\ v_3]=[x_1-x_6, x_2-x_5, x_3-x_4]$.

A way of implementing the product of $X_6$ by a vector $V=[v_1\ v_2\ v_3]^t$ is:

$u_1 = X_6(1,1)*v_1 + X_6(2,1)*v_2 + X_6(3,1)*v_3$ $u_2 = (v_1 - v_2 - v_3)*X_6(2,1)$ $u_3 = X_6(3,1)*v_1 - X_6(2,1)*v_2 + X_6(1,1)*v_3$ where $[u_1\ u_2\ u_3]^t$ is the destination vector.

Such an implementation leads to 7 multiplications and 6 additions.

It can be noted that:

$$\cos\left(\frac{\pi}{12}\right) - \cos\left(\frac{5\pi}{12}\right) = \cos\left(\frac{\pi}{4}\right)$$

Therefore, the following relationship between the values of the cosinus function can be define:

$$\left(\cos\left(\frac{\pi}{12}\right) \cdot a + \cos\left(\frac{5\pi}{12}\right) \cdot b\right) - \left(\cos\left(\frac{5\pi}{12}\right) \cdot a + \cos\left(\frac{\pi}{12}\right) \cdot b\right) =$$

$$\cos\left(\frac{\pi}{4}\right) \cdot a - \cos\left(\frac{\pi}{4}\right) \cdot b$$

Such a relationship can be advantageously exploited for computing the product:

$X_6 \cdot [v_1\ v_2\ V_3]^t$ as disclosed by the butterfly diagram shown on the left part of FIG. 7. Such a butterfly diagram is designed to implement the following computational steps:

$O(1) = c\frac{\pi}{12} \cdot v_1 + c\frac{5\pi}{12} \cdot v_3 = X_6(1,1) \cdot v_1 + X_6(3,1) \cdot v_3,$ $O(2) = c\frac{\pi}{4} \cdot v_2 = X_6(2,1) \cdot v_2,$ -continued $$O(3) = c_{\frac{5\pi}{12}} \cdot v_1 + c_{\frac{\pi}{12}} \cdot v_3 = X_6(3,1) \cdot v_1 + X_6(1,1) \cdot v_3$$

The fast implementation of $X_6$ disclosed above can be advantageously used in the computation of the second part of the transform matrix $A_6$ ($X_6 \cdot Y_1 - \overline{X_6 \cdot Y_2}$), as follows:

$$O(1) = c_{\frac{\pi}{12}} \cdot v_1 + c_{\frac{5\pi}{12}} \cdot v_3 = X_6(1,1) \cdot v_1 + X_6(3,1) \cdot v_3$$

$$O(2) = c_{\frac{\pi}{4}} \cdot v_2 = X_6(2,1) \cdot v_2$$

$$O(3) = c_{\frac{5\pi}{12}} \cdot v_1 + c_{\frac{\pi}{12}} \cdot v_3 = X_6(3,1) \cdot v_1 + X_6(1,1) \cdot v_3$$

$$u_1 = O(1) + O(2)$$

$$u_2 = O(1) - O(2) - O(3)$$

$$u_3 = -O(2) + O(3)$$

where $[v_1\ v_2\ v_3]^t$ corresponds to linear combinations of the input vector X with $$v_1 = x_1 - x_6$$

$$v_2 = x_2 - x_5$$

$$v_3 = x_3 - x_4,$$

with the input vector $X = [x_1\ x_2\ x_3\ x_4\ x_5\ x_6]^t$, and $[u_1\ u_2\ u_3]^t$ is the destination vector. The butterfly steps disclosed above generate even lines of the transformed vector:

$$[t_2 t_4 t_6] = [u_1 u_2 u_3]$$

This fast butterfly version of the transform matrix $X_6$ leads to 5 multiplications and 6 additions, instead of 9 multiplications and 6 additions for the straightforward matrix product.

The overall butterfly design for the one-dimension DCT with size 6 is shown on FIG. 8.

On FIG. 8, it appears that the fast implementation of the transform $A_6$ can be performed using the fast implementation of the transform for size 3 ($A_3$) applied to linear combinations of the input signal ($x_1, x_2, x_3, x_4, x_5, x_5$)$^t$ to obtain odd lines ($t_1, t_3, t_5$) of the transformed vector and the fast implementation of the complementary matrix $X_6$ applied to linear combinations of the input signal ($x_1, x_2, x_3, x_4, x_5, x_6$)$^t$ to obtain even lines ($t_2, t_4, t_6$) of the transformed signal.

A similar reasoning can be applied for computing the inverse transform $S_6$ for size 6. As $A_6$ is orthogonal: $A_6^{-1} = A_6^t$, so:

$$S_6 = A_6^{-1} = \sqrt{\frac{2}{6}} \begin{pmatrix} c_{\frac{\pi}{4}} & c_{\frac{\pi}{12}} & c_{\frac{\pi}{6}} & c_{\frac{\pi}{4}} & c_{\frac{\pi}{3}} & c_{\frac{5\pi}{12}} \\ c_{\frac{\pi}{4}} & c_{\frac{\pi}{4}} & 0 & -c_{\frac{\pi}{4}} & -1 & -c_{\frac{3\pi}{12}} \\ c_{\frac{\pi}{4}} & c_{\frac{5\pi}{12}} & -c_{\frac{\pi}{6}} & -c_{\frac{\pi}{4}} & c_{\frac{\pi}{3}} & c_{\frac{\pi}{12}} \\ c_{\frac{\pi}{4}} & -c_{\frac{5\pi}{12}} & -c_{\frac{\pi}{6}} & c_{\frac{\pi}{4}} & c_{\frac{\pi}{3}} & -c_{\frac{\pi}{12}} \\ c_{\frac{\pi}{4}} & -c_{\frac{\pi}{4}} & 0 & c_{\frac{\pi}{4}} & -1 & c_{\frac{3\pi}{12}} \\ c_{\frac{\pi}{4}} & -c_{\frac{\pi}{12}} & c_{\frac{\pi}{6}} & -c_{\frac{\pi}{4}} & c_{\frac{\pi}{3}} & -c_{\frac{5\pi}{12}} \end{pmatrix}$$

From $S_6$, it appears that the odd columns of $S_6$ comprises the coefficients of $A_3^{-1}$, so by permutating columns in the matrix $S_6$, we obtain:

$$P_c(S_6) = \sqrt{\frac{2}{6}} \begin{pmatrix} c_{\frac{\pi}{4}} & c_{\frac{\pi}{6}} & c_{\frac{\pi}{3}} & c_{\frac{\pi}{12}} & c_{\frac{\pi}{4}} & c_{\frac{5\pi}{12}} \\ c_{\frac{\pi}{4}} & 0 & -1 & c_{\frac{\pi}{4}} & -c_{\frac{\pi}{4}} & -c_{\frac{\pi}{4}} \\ c_{\frac{\pi}{4}} & -c_{\frac{\pi}{6}} & c_{\frac{\pi}{3}} & c_{\frac{5\pi}{12}} & -c_{\frac{\pi}{4}} & c_{\frac{\pi}{12}} \\ c_{\frac{\pi}{4}} & -c_{\frac{\pi}{6}} & c_{\frac{\pi}{3}} & -c_{\frac{5\pi}{12}} & c_{\frac{\pi}{4}} & -c_{\frac{\pi}{12}} \\ c_{\frac{\pi}{4}} & 0 & -1 & -c_{\frac{\pi}{4}} & c_{\frac{\pi}{4}} & c_{\frac{\pi}{4}} \\ c_{\frac{\pi}{4}} & c_{\frac{\pi}{6}} & c_{\frac{\pi}{3}} & -c_{\frac{\pi}{12}} & -c_{\frac{\pi}{4}} & -c_{\frac{5\pi}{12}} \end{pmatrix}$$

$P_c(S_6)$ comprises the matrix $A_3^t$ on the top-left 3×3 sub-matrix and the matrix $X_6$ in the 3×3 top-right sub-matrix. Thus:

$$P_c(S_6) = \sqrt{\frac{2}{6}} \begin{pmatrix} S_3' & X_6 \\ \overline{S'_3} & -\widehat{X_6} \end{pmatrix},$$

where $\overline{S'_3}$ represents the matrix $S'_3$ in a horizontally flipped version and $-\widehat{X_6}$ is the opposite of the horizontally flipped version of $X_6$. Therefore:

$$P_c(DCT^{-1}(X)) =$$

$$P_c\left(DCT\left(\begin{bmatrix} Y_1 \\ Y_2 \end{bmatrix}\right)\right) = \sqrt{\frac{2}{6}} \begin{pmatrix} S_3' \cdot Y_1 + X_6 \cdot Y_2 \\ \overline{S'_3} \cdot Y_1 - \widehat{X_6} \cdot Y_2 \end{pmatrix} = \sqrt{\frac{2}{6}} \begin{pmatrix} S_3' \cdot Y_1 + X_6 \cdot Y_2 \\ \overline{S'_3 \cdot Y_1 - \widehat{X_6} \cdot Y_2} \end{pmatrix}$$

Thus, the fast implementation of the inverse DCT with size 6 can simply re-use the fast implementation of the inverse DCT with size 3 and the fast implementation of the product by matrix $X_6$ disclosed above.

Once these sub-processes are performed, two resulting sub-vectors are obtained:

$$(a'_1 a'_2 a'_3)^t = \sqrt{2/6} \cdot S'_3 \cdot Y_1$$

$$(x'_1 x'_2 x'_3)^t = \sqrt{2/6} \cdot X_6 \cdot Y_2$$

the inverse transform for size 6 is obtained by gathering the sub-vectors as follows:

$$P_c(DCT^{-1}(X)) = [(a'_1 + x'_1)(a'_2 + x'_2)(a'_3 + x'_3)(a'_1 - x'_1) (a'_2 - x'_2)(a'_3 - x'_3)]^t$$

Therefore, a fast implementation of the 1D inverse DCT with size 6, applied on a vector $(t_1, t_2, t_3, t_4, t_5, t_6)^t$ in the transform domain, is as follows:

$$E(1) = t_1 \times S_6(1,1)$$

$$E(2) = t_3 \times S_6(1,3)$$

$$E(3) = t_5 \times S_6(1,5)$$

$$a'_1 = E(1) + E(2) + E(3)$$

$$a'_2 = E(1) - t_5$$

$$a'_3 = E(1) - E(2) + E(3)$$

$$O(1) = X_6(1,1) \cdot t_4 + X_6(3,1) \cdot t_6$$

$$O(2) = X_6(2,1) \cdot t_5$$

$$O(3) = X_6(3,1) \cdot t_4 + X_6(1,1) \cdot t_6$$

$$x'_1 = O(1) + O(2)$$

$x'_2 = O(1) - O(2) - O(3)$ $x'_3 = O(2) + O(3)$

Butterfly Implementations for Matrix Transform and Inverse Matrix Transform with Size 12

Below, butterfly implementations for matrix transform and inverse matrix transform with a size equal to 12 are disclosed.

The 1D DCT as applied on a 12×1 vector is obtained through the matrix:

$$A_{12} = \sqrt{\frac{2}{12}} \left( c(k) \cdot \cos\left( \frac{(2j+1)k\pi}{24} \right) \right)_{k,j \in [0,11]}$$

By grouping odd lines on one side and even lines on the other side, and by permutating lines of the matrix $A_{12}$, one obtains:

$$P_l(A_{12}) = \sqrt{\frac{2}{12}} \cdot \begin{pmatrix} \sqrt{\frac{6}{2}} \cdot A_6 & \sqrt{\frac{6}{2}} \cdot \overline{A_6} \\ X_{12} & -\overline{X_{12}} \end{pmatrix} = \sqrt{\frac{2}{12}} \cdot \begin{pmatrix} A'_6 & \overline{A'_6} \\ X_{12} & -\overline{X_{12}} \end{pmatrix}$$

where the complementary matrix $X_{12}$ is defined by:

$$X_{12} = \left( \cos\frac{(2j+1)(2k+1)}{24} \right)_{k,j \in [0,5]}$$

In other words, $X_{12}$ is the matrix of cosine values applied on the values contained in the following matrix:

$$X_{12} = \cos\left( \begin{pmatrix} 1 & 3 & 5 & 7 & 9 & 11 \\ 3 & 9 & 15 & 21 & 27 & 33 \\ 5 & 15 & 25 & 35 & 45 & 55 \\ 7 & 21 & 35 & 49 & 63 & 77 \\ 9 & 27 & 45 & 63 & 81 & 99 \\ 11 & 33 & 55 & 77 & 99 & 121 \end{pmatrix} \times \frac{\pi}{24} \right)$$

Such a matrix can be simplified as:

$$X_{12} = \cos\left( \begin{pmatrix} 1 & 3 & 5 & 7 & 9 & 11 \\ 3 & 9 & -9 & -3 & -3 & -9 \\ 5 & -9 & -1 & -11 & 3 & 7 \\ 7 & -3 & -11 & 1 & -9 & -5 \\ 9 & -3 & 3 & -9 & -9 & 3 \\ 11 & -9 & 7 & -5 & 3 & -1 \end{pmatrix} \times \frac{\pi}{24} \right)$$

if the cosine of a matrix $M=(m_{ij})_{i,j \in [1,n]}$ is defined as the matrix $\cos(M)=(\cos(m_{ij}))_{i,j \in [1,n]}$.

To implement a fast version of the product $X_{12} \times [v_1\ v_2\ \ldots\ v_{12}]^t$, we exploit the following relationships of the cosine function:

$$\cos\left(\frac{\pi}{24}\right) = \cos\left(\frac{\pi}{4}\right) \cdot \left( \cos\left(\frac{7\pi}{24}\right) + \cos\left(\frac{5\pi}{24}\right) \right)$$

$$\cos\left(\frac{5\pi}{24}\right) = \cos\left(\frac{\pi}{4}\right) \cdot \left( \cos\left(\frac{11\pi}{24}\right) + \cos\left(\frac{\pi}{24}\right) \right)$$

$$\cos\left(\frac{7\pi}{24}\right) = \cos\left(\frac{\pi}{4}\right) \cdot \left( \cos\left(\frac{\pi}{24}\right) - \cos\left(\frac{11\pi}{24}\right) \right)$$

$$\cos\left(\frac{11\pi}{24}\right) = \cos\left(\frac{\pi}{4}\right) \cdot \left( \cos\left(\frac{5\pi}{24}\right) - \cos\left(\frac{7\pi}{24}\right) \right)$$

$$\cos\left(\frac{3\pi}{24}\right) = (\sqrt{2}+1)\cos\left(\frac{9\pi}{24}\right)$$

$$\cos\left(\frac{9\pi}{24}\right) = \cos\left(\frac{\pi}{4}\right) \cdot \left( \cos\left(\frac{3\pi}{24}\right) - \cos\left(\frac{9\pi}{24}\right) \right)$$

$$\cos\left(\frac{3\pi}{24}\right) = \cos\left(\frac{\pi}{4}\right) \cdot \left( \cos\left(\frac{9\pi}{24}\right) + \cos\left(\frac{3\pi}{24}\right) \right)$$

Therefore, these properties are used to establish relationships between the lines and columns of $X_{12}$, as illustrated on FIG. 9. From the above equations, one can deduce how some lines of matrix $X_{12}$ can be expressed as a linear combination of other lines of $X_{12}$. On FIG. 9, the signs on the top of the matrix indicate if the linear combination is multiplied by $-1$ or not to obtain the destination value.

The relationships between the lines of $X_{12}$ illustrated on FIG. 9 are further disclosed below:

$\forall i \in \{1,4,5\}, X_{12}(1,i) = \frac{1}{\sqrt{2}}(X_{12}(3,i) + X_{12}(4,i))$ $\forall i \in \{2,3,6\}, X_{12}(1,i) = -\frac{1}{\sqrt{2}}(X_{12}(3,i) + X_{12}(4,i))$ $\forall i \in \{1,4,5\}, X_{12}(6,i) = \frac{1}{\sqrt{2}}(X_{12}(3,i) - X_{12}(4,i))$ $\forall i \in \{2,3,6\}, X_{12}(6,i) = -\frac{1}{\sqrt{2}}(X_{12}(3,i) - X_{12}(4,i))$ $\forall i \in \{1,4,5\}, X_{12}(2,i) = (1+\sqrt{2})X_{12}(5,i)$ $\forall i \in \{2,3,6\}, X_{12}(5,i) = -(1+\sqrt{2})X_{12}(2,i)$ Therefore, a fast implementation of the product of $X_{12}$ by a 6×1 vector $V=[v_1\ v_2\ v_3\ v_4\ v_5\ v_6]^t$ comprises the following operations:

$O(1) = \sum_{i \in \{1,4,5\}} X_{12}(3,i) \cdot v_i = \sum_{i \in \{1,4,5\}} A_{12}(6,i) \cdot v_i$ $O(2) = \sum_{i \in \{2,3,6\}} X_{12}(3,i) \cdot v_i = \sum_{i \in \{2,3,6\}} A_{12}(6,i) \cdot v_i$ $O(3) = \sum_{i \in \{1,4,5\}} X_{12}(4,i) \cdot v_i = \sum_{i \in \{1,4,5\}} A_{12}(8,i) \cdot v_i$ $O(4) = \sum_{i \in \{2,3,6\}} X_{12}(4,i) \cdot v_i = \sum_{i \in \{2,3,6\}} A_{12}(8,i) \cdot v_i$ $O(5) = X_{12}(2,2) \cdot (v_2 - v_3 - v_6) = A_{12}(4,2) \cdot (v_2 - v_3 - v_6)$ $O(6) = X_{12}(2,2) \cdot (v_1 - v_4 - v_5) = A_{12}(4,2) \cdot (v_1 - v_4 - v_5)$ $u_3 = O(1) + O(2)$ $u_4 = O(3) + O(4)$ $OO(1) = O(1) + O(3)$ $OO(2) = O(2) + O(4)$ $OO(3) = O(1) - O(3)$ -continued $$OO(4) = O(2) - O(4)$$

$$u_1 = \frac{1}{\sqrt{2}}(OO(1) - OO(2))$$

$$u_6 = \frac{1}{\sqrt{2}}(OO(3) - OO(4))$$

$$u_2 = O(5) + (1 + \sqrt{2})O(6)$$

$$u_5 = O(6) - (1 + \sqrt{2})O(5)$$

A compact view of such computations is provided under the form of a butterfly diagram and illustrated on FIG. 10.

Therefore, a fast implementation of the transform $A_{12}$, as illustrated on FIG. 11, can be performed using a fast implementation of the transform for size 6 ($A_6$) applied to linear combinations of the input signal $(x_1, x_2, x_3, x_4, x_5, x_6, x_7, x_8, x_9, x_{10}, x_{11}, x_{12})^t$ to obtain odd lines $(t_1, t_3, t_5, t_7, t_9, t_{11})$ of the transformed vector and the fast implementation of the complementary matrix $X_{12}$ disclosed above applied to linear combinations of the input signal $(x_1, x_2, x_3, x_4, x_5, x_6, x_7, x_8, x_9, x_{10}, x_{11}, x_{12})^t$ to obtain even lines $(t_2, t_4, t_6, t_8, t_{10}, t_{12})$ of the transformed signal, with $t_2, t_6, t_{10}, t_4, t_8, t_{12}$ corresponding respectively to the output signal $(u_1, u_2, u_3, u_4, u_5, u_6)$ product of $X_{12}$ disclosed above.

In the same way as for the inverse DCT with size 6, the inverse DCT for size 12 is obtained with the following matrix:

$$S_{12} = A_{12}^{-1} = A_{12}^t$$

In the same way as disclosed above, it can be shown that:

$$P_c(S_{12}) = \sqrt{\frac{2}{12}} \begin{pmatrix} S'_6 & X_{12} \\ \overline{S'_6} & -\overline{X_{12}} \end{pmatrix}$$

where $P_c(S_{12})$ represents a permutation of the columns of matrix $S_{12}$, basically grouping odd columns on one side, and even columns on the other side. Thus the implementation of a fast inverse DCT with size 12 can be determined recursively by re-using the fast implementation of the inverse DCT with size 6 and the previously described multiplication by matrix $X_{12}$. Once these sub-processes at size 6 are done the inverse transform at size 12 is obtained by combining the resulting sub-results with size 6 in the same way as already presented for the butterfly implementation of the inverse transform with size 6:

$$P_c(DCT^{-1}(X)) = P_c(S_{12} \times X) = [(a'_1 + x'_1) \ldots (a'_6 + x'_6) (a'_1 - x'_1) \ldots (a'_6 - x'_6)]^t$$

Where:

$$(a'_1 \ldots a'_6)^t = \sqrt{2/6} \cdot A'_6 \cdot (t_1, t_3, t_5, t_7, t_9, t_{11})^t$$

$$(x'_1 \ldots x'_6)^t = \sqrt{2/6} \cdot X_{12}'' \cdot (t_2, t_4, t_6, t_8, t_{10}, t_{12})^t$$

Butterfly Implementations for Matrix Transform and Inverse Matrix Transform with Size 12

Below the fast implementation of the DCT transform with size 24, according to the present invention is disclosed. A compact view of such computations is illustrated on FIG. 12. The butterfly version of DCT with size 24 is constructed in a similar way as for the size 12. First, if the DCT matrix for size 24 is noted:

$$A_{24} = \sqrt{\frac{2}{24}} \left( c(k) \cdot \cos\left(\frac{(2j+1)k\pi}{48}\right) \right)_{k,j \in [0,23]}$$

Then it can be shown that:

$$P_l(A_{24}) = \sqrt{\frac{2}{24}} \cdot \begin{pmatrix} \sqrt{\frac{12}{2}} \cdot A_{12} & \sqrt{\frac{12}{2}} \cdot \overline{A_{12}} \\ X_{24} & -\overline{X_{24}} \end{pmatrix} = \sqrt{\frac{2}{24}} \cdot \begin{pmatrix} A'_{12} & \overline{A'_{12}} \\ X_{24} & -\overline{X_{24}} \end{pmatrix}$$

where the 12×12 matrix $X_{24}$ is defined as:

$$X_{24} = \left( \cos\frac{(2j+1)(2k+1)\pi}{48} \right)_{k,j \in [0,11]}$$

The matrix $X_{24}$ can be written as:

$$X_{24} = \cos \begin{bmatrix} 1 & 3 & 5 & 7 & 9 & 11 & 13 & 15 & 17 & 19 & 21 & 23 \\ 3 & 9 & 15 & 21 & -21 & -15 & -9 & -3 & -3 & -9 & -15 & -21 \\ 5 & 15 & -23 & -13 & -3 & -7 & -17 & 21 & 11 & 1 & 9 & 19 \\ 7 & 21 & -13 & -1 & -15 & 19 & 5 & 9 & 23 & -11 & -3 & -17 \\ 9 & -21 & -3 & -15 & 15 & 3 & 21 & -9 & -9 & 21 & 3 & 15 \\ 11 & -15 & -7 & 19 & 3 & -23 & -1 & -21 & 5 & 17 & -9 & -13 \\ 13 & -9 & -17 & 5 & 21 & -1 & 23 & 3 & -19 & -7 & 15 & 11 \\ 15 & -3 & 21 & 9 & -9 & -21 & 3 & -15 & -15 & 3 & -21 & -9 \\ 17 & -3 & 11 & 23 & -9 & 5 & -19 & -15 & 1 & -13 & -21 & 7 \\ 19 & -9 & 1 & -11 & 21 & 17 & -7 & 3 & -13 & 23 & 15 & -5 \\ 21 & -15 & 9 & -3 & 3 & -9 & 15 & -21 & -21 & 15 & -9 & 3 \\ 23 & -21 & 19 & 15 & 15 & -13 & 11 & -9 & 7 & -5 & 3 & -1 \end{bmatrix} \times \frac{\pi}{48}$$

if we define the cosine of a matrix $M = (m_{ij})_{i,j \in [1,n]}$ as the matrix $\cos(M) = (\cos(m_{ij})_{i,j \in [1,n]}$. Linear relationship that exist between lines and columns in the matrix $X_{24}$ are identified as follows:

$$\cos\left(\frac{13\pi}{48}\right) = \cos\left(\frac{\pi}{4}\right) \cdot \left(\cos\left(\frac{\pi}{48}\right) - \cos\left(\frac{23\pi}{48}\right)\right)$$

$$\cos\left(\frac{11\pi}{48}\right) = \cos\left(\frac{\pi}{4}\right) \cdot \left(\cos\left(\frac{\pi}{48}\right) + \cos\left(\frac{23\pi}{48}\right)\right)$$

$$\cos\left(\frac{7\pi}{48}\right) = \cos\left(\frac{\pi}{4}\right) \cdot \left(\cos\left(\frac{5\pi}{48}\right) + \cos\left(\frac{19\pi}{48}\right)\right)$$

$$\cos\left(\frac{5\pi}{48}\right) = \cos\left(\frac{\pi}{4}\right) \cdot \left(\cos\left(\frac{7\pi}{48}\right) + \cos\left(\frac{17\pi}{48}\right)\right)$$

$$\cos\left(\frac{17\pi}{48}\right) = \cos\left(\frac{\pi}{4}\right) \cdot \left(\cos\left(\frac{5\pi}{48}\right) - \cos\left(\frac{19\pi}{48}\right)\right)$$

$$\cos\left(\frac{19\pi}{48}\right) = \cos\left(\frac{\pi}{4}\right) \cdot \left(\cos\left(\frac{7\pi}{48}\right) - \cos\left(\frac{17\pi}{48}\right)\right)$$

$$\cos\left(\frac{\pi}{48}\right) = \cos\left(\frac{\pi}{4}\right) \cdot \left(\cos\left(\frac{11\pi}{48}\right) + \cos\left(\frac{13\pi}{48}\right)\right)$$

$$\cos\left(\frac{23\pi}{48}\right) = \cos\left(\frac{\pi}{4}\right) \cdot \left(\cos\left(\frac{11\pi}{48}\right) - \cos\left(\frac{3\pi}{48}\right)\right)$$

$$\cos\left(\frac{21\pi}{48}\right) = \cos\left(\frac{\pi}{4}\right) \cdot \left(\cos\left(\frac{9\pi}{48}\right) - \cos\left(\frac{15\pi}{48}\right)\right)$$

-continued $$\cos\left(\frac{3\pi}{48}\right) = \cos(\frac{\pi}{4}) \cdot \left(\cos\left(\frac{9\pi}{48}\right) + \cos\left(\frac{15\pi}{48}\right)\right)$$

The following linear dependencies between lines and columns are advantageously used to perform the DCT with size 24 as follows:

$$I^+ = \{1,4,5,8,9,12\}$$

$$I^- = \{2,3,6,7,10,11\}$$

$$L_{idx} = \{1,2,3,10,11,12\}$$

$$\forall j \in L_{idx}, l_{pos}(j) = \Sigma_{i \in I^+} X_{12}(j,i) v_i,$$

$$\forall j \in L_{idx}, l_{neg}(j) = \sum_{i \in I^-} -X_{12}(j,i) \cdot v_i,$$

$$l\_final(4) = \frac{1}{\sqrt{2}}((l_{pos(3)} + l_{pos(10)}) - (l_{neg(3)} + l_{neg(10)}))$$

$$l\_final(5) = \frac{1}{\sqrt{2}}((l_{pos(2)} + l_{pos(11)}) - (l_{neg(2)} + l_{neg(11)}))$$

$$l\_final(6) = \frac{1}{\sqrt{2}}((l_{pos(1)} + l_{pos(12)}) - (l_{neg(1)} + l_{neg(12)}))$$

$$l\_final(7) = \frac{1}{\sqrt{2}}((l\_pos(1) - l\_pos(12)) - (l\_neg(1) - l\_neg(12)))$$

$$l\_final(8) = \frac{1}{\sqrt{2}}(((l_{pos(2)} - l_{pos(11)}) - (l_{neg(2)} - l_{neg(11)}))$$

$$l_{final(9)} = \frac{1}{\sqrt{2}}((l_{pos(3)} - l_{pos(10)}) - (l_{neg(3)} - l_{neg(10)}))$$

$$\forall j \in L_{idx}, l_{final}(j) = l_{pos}(j) + l_{neg}(j)$$

A similar construction as for the inverse DCT with size 12 can be used for determining the inverse DCT transform with size 24. It can thus be shown that:

$$P_c(S_{24}) = \sqrt{\frac{2}{24}} \begin{pmatrix} S'_{12} & X_{24} \\ \overline{S'}_{12} & -\overline{X}_{24} \end{pmatrix}$$

Thus, the fast inverse DCT transform with size 24 can be designed in a recursive fashion by re-using the inverse DCT butterfly method for size 12 and the method provided above for the $X_{24}$ matrix operator.

General Butterfly Implementation

The principle has been disclosed above for fast DCT transform with size equals to 3, 6, 12 and 24. In a more general case, a fast integer DCT transform implementation for block sizes equal to $3 \cdot 2^n$, $n \geq 0$, i.e. for blocks having a size multiple of 3 in at least one dimension (width, height), can be designed in a recursive way, as illustrated on FIG. 13.

Such fast integer DCT transform implementation for blocks having a size N multiple of 3 in at least one dimension can be designed in a general case, for N>3, using a butterfly implementation of the transform matrix $A_N$. Such a butterfly implementation illustrated on FIG. 13 is based on a matrix $P_I$ ($A_N$) wherein the N/2 first lines of $P_I$ ($A_N$) corresponds to odd lines of $A_N$ and N/2 last lines of $P_I$ ($A_N$) corresponds to even lines of $A_N$.

Furthermore, the matrix $P_I$ ($A_N$) can be represented by:

$$P_I(A_N) = \sqrt{\frac{2}{N}} \begin{pmatrix} \sqrt{\frac{N/2}{2}} \times A_{N/2} & \sqrt{\frac{N/2}{2}} \times \overline{A_{N/2}} \\ X_N & -\overline{X_N} \end{pmatrix},$$

where $\overline{A_{N/2}}$ represents a vertically flipped version of the matrix $A_{N/2}$, and $\overline{-X_N}$ represents the opposite of the vertically flipped version of a complementary matrix transform $X_N$. Thus, it is possible to re-use the butterfly implementation designed for the matrix $A_{N/2}$ by applying the fast implementation of the transform for size N/2 ($A_{N/2}$) applied to linear combinations of the input signal $(x_i)_{i=1,N-1}^t$ to obtain odd lines of the transformed vector.

The complementary matrix transform $X_N$ is represented by:

$$X_N = \cos\left(\frac{(2j+1) \times (2k+1)\pi}{2N}\right)_{k,j \in [0,N/2]}.$$

Thanks to the properties of the cosine function, dependencies between lines and columns of the matrix $X_N$ can be determined and advantageously used for designing a fast implementation of $X_N$ to be applied to linear combinations of the input signal $(x_i)_{i=1,N-1}^t$ to obtain odd lines of the transformed signal.

These linear dependencies between lines and columns of $X_N$ result from the following generic relationship:

$$\forall k \in \left[0, \frac{N}{4}\right], j \in \left[0, \frac{N}{2}\right], X_N\left(k + \frac{N}{4}, j\right) =$$

$$\cos\left(\frac{\left(2\left(k + \frac{N}{4}\right) + 1\right)(2j+1)\pi}{2N}\right) = \cos\left(\frac{(2j+1)\pi}{4} + \frac{(2k+1)(2j+1)\pi}{2N}\right) =$$

$$\cos\left(\frac{(2j+1)\pi}{4}\right)\left[\cos\left(\frac{(2k+1)(2j+1)\pi}{2N}\right) \pm \sin\left(\frac{(2k+1)(2j+1)\pi}{2N}\right)\right] =$$

$$\cos\left(\frac{(2j+1)\pi}{4}\right)\left[\cos\left(\frac{(2k+1)(2j+1)\pi}{2N}\right) \pm \right.$$

$$\left. \cos\left(\frac{(N-(2k+1)(2j+1))\pi}{2N}\right)\right]$$

Since N is even and $(2k+1)(2j+1)$ is odd, $(N-(2k+1)(2j+1))$ is also odd, thus the term $$\cos\left(\frac{(N-(2k+1)(2j+1))\pi}{2N}\right)$$

corresponds to a member of matrix $X_N$ located on a line different from $$\left(k + \frac{n}{4}\right).$$

FIG. 14 illustrates a block diagram of an exemplary decoder according to an embodiment of the present principles. A bitstream representative of a coded image or video comprises coded data representative of at least one block of said image or video, wherein said block has been coded according to an embodiment of the present principles.

The coded data is passed to the video decoding modules of the video decoder 30. As illustrated in FIG. 14, coded data is passed to an entropy decoding module that performs entropy decoding and delivers quantized coefficients QCOEF' to an inverse quantization module and syntax elements to a prediction module.

The quantized coefficients QCOEF' are inverse quantized by the inverse quantization module and inverse transformed by an inverse transform module delivering residual blocks data RES'. A block to be reconstructed may have been coded with a size equal to $3 \times 2^N$ in at least one dimension. According to the present principle, the inverse transform module is configured to operate on such blocks by applying a 2D transform with size $3 \cdot 2^n$ in width or height. The inverse transform module is thus configured to implement one of the fast inverse 1D DCT transform as disclosed above according to the size of the block.

The prediction module builds prediction blocks PRED according to the syntax element and using a motion compensation module if a current block has been inter-predicted or an intra prediction module if the current block has been spatially predicted.

A reconstructed picture I' is obtained by adding prediction blocks PRED and residual blocks RES'. The reconstructed picture I' is stored in a reference frame memory for later use as reference frame. The reconstructed picture I' is then outputted by the video decoder 30.

The decoder 30 may be implemented as hardware or software or a combination of hardware and software thereof.

FIG. 15 illustrates a flow diagram of an exemplary method for encoding a video according to an embodiment of the present principles. According to this embodiment, at least one block BLK of a picture of the video has a size N which is not a power of 2 along at least one dimension.

According to a particular embodiment, N is a multiple of 3 and can be written as $3 \cdot 2^n$, $n \geq 0$. In step 40, a predicted block is determined for the current block BLK. The predicted block can be determined according to classical block prediction method (intra or inter prediction). According to the embodiment disclosed herein, the predicted block size's is equal to the size of the block BLK.

In step 41, a residual block is obtained by computing a difference between the current block BLK and the predicted block. The residual block, thus, has a size N along at least one dimension.

In step 42, block transform of the residual block is performed. The block transform is performed by applying a 2D separable DCT transform, i.e. by applying a 1D DCT transform on the lines of the residual block, and then 1D DCT transform on the columns of the residual block. If the lines, respectively columns, of the residual block have a size equal to $3 \cdot 2^n$, $n \geq 0$, a fast 1D DCT transform implementation as disclosed above is used. Otherwise, if the lines, respectively columns, of the residual block have a size equal to a power of 2, known fast 1D DCT transform implementations are used.

In step 43, the transformed residual block is then quantized and entropy coded.

FIG. 16 illustrates a flow diagram of an exemplary method for decoding a video according to an embodiment of the present principles. According to this embodiment, at least one block BLK of a picture of the video has a size N which is not a power of 2 along at least one dimension.

According to a particular embodiment, N is a multiple of 3 and can be written as $3 \cdot 2^n$, $n \geq 0$.

The current block BLK is reconstructed as follows.

In step 50, a transformed residual block is entropy decoded from a bitstream and inverse quantized. The transformed residual block size's is equal to the size of the current block BLK and comprises decoded data for the current block BLK to reconstruct.

In step 51, inverse block transform is performed on the transformed residual block. The inverse block transform is performed by applying a 2D separable inverse DCT transform, i.e. by applying a 1D inverse DCT transform on the lines of the transformed residual block, and then a 1D inverse DCT transform on the columns of the transformed residual block. If the lines, respectively columns, of the transformed residual block have a size equal to $3 \cdot 2^n$, $n \geq 0$, a fast 1D inverse DCT transform implementation as disclosed above is used. Otherwise, if the lines, respectively columns, of the transformed residual block have a size equal to a power of 2, known fast 1D inverse DCT transform implementations are used.

Inverse block transform delivers a residual block with a size equals to the size of the transformed residual block.

In step 52, a predicted block is determined for the current block BLK to reconstruct. The predicted block can be determined according to classical block prediction method (intra ou inter prediction). According to the embodiment disclosed herein, the predicted block has a same size as the current block BLK.

In step 53, the current block BLK is reconstructed by adding the predicted block to the residual block.

FIG. 17 illustrates an exemplary encoder that may be used in one embodiment of the present principles. Such an apparatus for encoding a video is configured to implement the method for encoding a video according to the present principles. The encoder apparatus of FIG. 17 may be as an example the encoder 20 as described in FIG. 2.

In the example shown in FIG. 17, the encoder apparatus comprises a processing unit PROC equipped for example with a processor and driven by a computer program PG stored in a memory MEM and implementing the method for encoding a video according to the present principles.

At initialization, the code instructions of the computer program PG are for example loaded into a RAM (not shown) and then executed by the processor of the processing unit PROC. The processor of the processing unit PROC implements the steps of the method for encoding a video which has been described here above, according to the instructions of the computer program PG.

Optionally, the encoder apparatus 20 comprises a communications unit COM to transmit an encoded bitstream to a decoder.

The encoder apparatus 20 also comprises an interface for receiving a picture to be coded, or a video.

FIG. 18 illustrates an exemplary decoder that may be used in one embodiment of the present principles. Such an apparatus for decoding a video is configured to implement the method for decoding a video according to the present principles. The decoder apparatus of FIG. 18 may be as an example the decoder 30 as described in FIG. 14.

In the example shown in FIG. 18, the decoder apparatus comprises a processing unit PROC equipped for example with a processor and driven by a computer program PG stored in a memory MEM and implementing the method for decoding a video according to the present principles.

At initialization, the code instructions of the computer program PG are for example loaded into a RAM (not shown) and then executed by the processor of the processing unit PROC. The processor of the processing unit PROC implements the steps of the method for decoding a video which has been described here above, according to the instructions of the computer program PG.

Optionally, the decoder apparatus 30 comprises a communications unit COM to receive an encoded bitstream from an encoder.

The decoder apparatus 30 also comprises an interface for displaying a reconstructed picture or a reconstructed video.

The invention claimed is:

1. A method for encoding a video comprising, for at least one block having a size N which is other than a power of 2 along one dimension:
   determining a predicted block for said at least one block;
   obtaining a residual block from said at least one block and said predicted block;
   performing block transform of said residual block, said residual block having a size N along one dimension,
   wherein said block transform involves separate application of one-dimensional (1D) horizontal transform and 1D vertical transform,
   wherein said 1D horizontal or vertical transform for said one dimension of said residual block is based on a transform matrix $A_N$ represented by:

$$A_N = \sqrt{\frac{2}{N}} \left( c(k) \times \cos\left(\frac{(2 \times j + 1) \times k\pi}{2 \times N}\right) \right)_{k,j \in [0, N-1]},$$

with k an integer k≥0, $$c(k) = \begin{cases} \frac{1}{\sqrt{2}} & \text{if } k = 0, \\ 1 & \text{if } k > 0 \end{cases},$$

wherein performing said 1D transform for said one dimension of said residual block comprises at least performing butterfly operations converting from a spatial domain to a transform domain a sample vector of size 3, said sample vector being based on samples of a row or a column of said residual block,
   wherein said butterfly operations are represented by:

$$E_1 = x_1 + x_3,$$

$$E_2 = x_1 - x_3,$$

$$t_1 = (E_1 + x_2) \times A_3(1,1),$$

$$t_2 = E_2 \times A_3(2,1),$$

$$t_3 = E_1 \times A_3(3,1) - x_2,$$

where $$\begin{bmatrix} x_1 \\ x_2 \\ x_3 \end{bmatrix}$$

represents said sample vector of size 3 from said spatial domain, $$\begin{bmatrix} t_1 \\ t_2 \\ t_3 \end{bmatrix}$$

represents a resulting sample vector of size 3 from said transform domain, and $E_1$ and $E_2$ represent intermediate values for butterfly design used for computing samples from said transform domain; and
   encoding said transformed residual block.

2. The method according to claim 1, wherein N is a multiple of 3.

3. The method for encoding according to claim 2, wherein said butterfly operations implement a transform matrix of size 3×3, said sample vector comprising:
   samples of a row or a column of said residual block along said one dimension in the case where N equals 3, and
   linear combinations of samples of a row or a column of said residual block taken along said one dimension in the case where N is higher than 3.

4. The method according to claim 1, said method further comprising, for N>3:
   performing butterfly operations converting from a spatial domain to a transform domain a sample vector of size N/2, wherein said butterfly operations implement a complementary matrix transform $X_N$ represented by:

$$X_N = \cos\left(\frac{(2j+1) \times (2k+1)\pi}{2N}\right)_{k,j \in [0, N/2]}.$$

5. The method according to claim 4, wherein butterfly operations converting from a spatial domain to a transform domain a sample vector of size 6, comprises at least the following operations:

$$E_1 = X_6(1,1) \times v_1 + X_6(3,1) \times v_3,$$

$$E_2 = X_6(2,1) \times v_2,$$

$$E_3 = X_6(3,1) \times v_1 + X_6(1,1) \times v_3,$$

$$u_1 = E_1 + E_2$$

$$u_2 = E_1 - E_2 - E_3$$

$$u_3 = E_2 + E_3$$

where $$\begin{bmatrix} v_1 \\ v_2 \\ v_3 \end{bmatrix} = \begin{bmatrix} x_1 - x_6 \\ x_2 - x_5 \\ x_3 - x_4 \end{bmatrix}$$

is obtained from said sample vector of size 6 from said spatial domain, $E_1$, $E_2$ and $E_3$ represent intermediate values for butterfly design further used for computing transformed samples from said transformed residual block, $X_6(k,j)$ represent corresponding values of the complementary matrix transform and $$\begin{bmatrix} u_1 \\ u_2 \\ u_3 \end{bmatrix}$$

is the resulting vector of samples in the transform domain.

6. The method according to claim 1, wherein, for N>3, a butterfly implementation of said matrix transform $A_N$ is based on a matrix $P_I(A_N)$ corresponding to a matrix wherein N/2 first lines of $P_I(A_N)$ corresponds to odd lines of $A_N$ and N/2 last lines of $P_I(A_N)$ corresponds to even lines of $A_N$.

7. The method according to claim 4, wherein said matrix $P_I(A_N)$ is represented by:

$$P_I(A_N) = \sqrt{\frac{2}{N}} \begin{pmatrix} \sqrt{\frac{N/2}{2}} \times A_{N/2} & \sqrt{\frac{N/2}{2}} \times \overline{A_{N/2}} \\ X_N & \overline{-X_N} \end{pmatrix},$$

where $\overline{A_{N/2}}$ represents a vertically flipped version of the matrix $A_{N/2}$, and $\overline{-X_N}$ represents an opposed vertically flipped version of said complementary matrix transform $X_N$.

8. A method for decoding a video comprising, for at least one block having a size N which is other than a power of 2 along one dimension:

decoding a transformed residual block;

performing inverse block transform of said transformed residual block, said residual block having a size N along one dimension, wherein said inverse block transform involves separate application of one-dimensional (1D) horizontal inverse transforms and 1D vertical inverse transform, wherein said 1D horizontal or vertical inverse transform for said one dimension is based on a transform matrix $S_N$ represented by:

$$S_N = \sqrt{\frac{2}{N}} \left( c(k) \times \cos\left( \frac{(2 \times j + 1) \times k\pi}{2 \times N} \right) \right)_{j,k \in [0, N-1]},$$

with k an integer k≥0, $$c(k) = \begin{cases} \frac{1}{\sqrt{2}} & \text{if } k = 0, \\ 1 & \text{if } k > 0 \end{cases}.$$

wherein performing said 1D inverse transform of said transformed residual block comprises at least performing butterfly operations converting from a transform domain to a spatial domain a sample vector of size 3, said sample vector being based on samples of a row or a column of said transformed residual block, wherein said butterfly operations are represented by:

$E_1 = t_1 \times S_3(1,1),$ $E_2 = t_2 \times S_3(1,2),$ $E_3 = t_3 \times S_3(1,3),$ $x_1 = E_1 + E_2 + E_3,$ $x_2 = E_1 - t_3,$ $x_3 = E_1 - E_2 + E_3,$ where $$\begin{bmatrix} x_1 \\ x_2 \\ x_3 \end{bmatrix}$$

represents a resulting sample vector of size 3 from said spatial domain, $$\begin{bmatrix} t_1 \\ t_2 \\ t_3 \end{bmatrix}$$

represents said sample vector of size 3 from said transform domain, and $E_1$, $E_2$ and $E_3$ represent intermediate values for butterfly design used for computing samples from said spatial domain;

determining a predicted block for said at least one block; and reconstructing said at least one block from said inverse transformed residual block and said predicted block.

9. The method according to claim 8, wherein N is a multiple of 3.

10. The method according to claim 9, wherein said butterfly operations implement a transform matrix of size 3×3, said sample vector comprising:

samples of a row or a column of said transformed residual block along said one dimension in the case where N equals 3, and linear combinations of samples of a row or a column of said transformed residual block taken along said one dimension in the case where N is higher than 3.

11. The method according to claim 8, said method further comprising, for N>3:

performing butterfly operations converting from a transform domain to a spatial domain a sample vector of size N/2, wherein said butterfly operations implement a complementary matrix transform $X_N$ represented by:

$$X_N = \cos\left( \frac{(2j+1) \times (2k+1)\pi}{2N} \right)_{k,j \in [0, N/2]}.$$

12. The method according to claim 11, wherein butterfly operations converting from a transform domain to a spatial domain a sample vector of size 6, comprises at least the following operations:

$E_1 = X_6(1,1) \times u_1 + X_6(3,1) \times u_3,$ $E_2 = X_6(2,1) \times u_2,$ $E_3 = X_6(3,1) \times u_1 + X_6(1,1) \times u_3,$ $v_1 = E_1 + E_2,$ $v_2 = E_1 - E_2 - E_3,$ $v_3 = E_2 + E_3$ where $$\begin{bmatrix} u_1 \\ u_2 \\ u_3 \end{bmatrix}$$

represents said sample vector of size 3 from said transform domain, $E_1$, $E_2$ and $E_3$ represent intermediate values for butterfly design further used for computing transformed samples from said transformed residual block, $X_6(k,j)$ represent corresponding values of the complementary matrix transform and $$\begin{bmatrix} v_1 \\ v_2 \\ v_3 \end{bmatrix}$$

is the resulting vector of samples in the spatial domain.

13. The method according to claim 11, wherein said butterfly operations implementing said matrix transform $X_N$ uses linear combinations of columns from said matrix transform $X_N$.

14. The method according to claim 8, wherein, for N>3, a butterfly implementation of said matrix transform $S_N$ is based on a matrix $P_c(S_N)$ corresponding to a matrix wherein N/2 first column of $P_c(S_N)$ corresponds to even columns of $S_N$ and N/2 last columns of $(S_N)$ corresponds to odd columns of $S_N$.

15. A method according to claim 14, wherein said matrix $P_c(S_N)$ is represented by:

$$P_c(S_N) = \sqrt{\frac{2}{N}} \begin{pmatrix} \sqrt{\frac{N/2}{2}} \times S_{N/2} & X_N \\ \sqrt{\frac{N/2}{2}} \times \widetilde{S_{N/2}} & -\widetilde{X_N} \end{pmatrix},$$

where $\widetilde{S_{N/2}}$ represents a horizontally flipped version of the matrix $S_{N/2}$, and $-\widetilde{X_N}$ represents an opposed horizontally flipped version of said complementary matrix transform $X_N$.

16. An apparatus for encoding a video comprising one or more processors, wherein said one or more processors are configured to, for at least one block having a size N which is other than a power of 2 along one dimension:
   determine a predicted block for said at least one block;
   obtain a residual block from said at least one block and said predicted block;
   perform block transform of said residual block, said residual block having a size N along one dimension,
   wherein said block transform involves separate application of one-dimensional (1D) horizontal transform and 1D vertical transform,
   wherein said 1D horizontal or vertical transform for said one dimension of said residual block is based on a transform matrix $A_N$ represented by:

$$A_N = \sqrt{\frac{2}{N}} \left( c(k) \times \cos\left(\frac{(2 \times j + 1) \times k\pi}{2 \times N}\right) \right)_{k,j \in [0, N-1]},$$

with k an integer $$k \geq 0, \; c(k) = \begin{cases} \frac{1}{\sqrt{2}} & \text{if } k = 0, \\ 1 & \text{if } k > 0 \end{cases},$$

wherein said 1D transform for said one dimension of said residual block is performed by using butterfly operations converting from a spatial domain to a transform domain a sample vector of size 3, said sample vector being based on samples of a row or a column of said residual block,
wherein said butterfly operations are represented by:

$E_1 = x_1 + x_3$, $E_2 = x_1 - x_3$, $t_1 = (E_1 + x_2) \times A_3(1,1)$, $t_2 = E_2 \times A_3(2,1)$, $t_3 = E_1 \times A_3(3,1) - x_2$, where $$\begin{bmatrix} x_1 \\ x_2 \\ x_3 \end{bmatrix}$$

represents said sample vector of size 3 from said spatial domain, $$\begin{bmatrix} t_1 \\ t_2 \\ t_3 \end{bmatrix}$$

represents a resulting sample vector of size 3 from said transform domain, and $E_1$ and $E_2$ represent intermediate values for butterfly design used for computing samples from said transform domain; and
   encode said transformed residual block.

17. An apparatus for decoding a video comprising one or more processors, wherein said one or more processors are configured to, for at least one block having a size N which is other than a power of 2 along one dimension:
   decode a transformed residual block;
   perform inverse block transform of said transformed residual block, said residual block having a size N along one dimension,
   wherein said block transform involves separate application of one-dimensional (1D) horizontal inverse transform and 1D vertical inverse transform,
   wherein said 1D horizontal or vertical inverse transform for said one dimension of said transformed residual block is based on a transform matrix $S_N$ represented by:

$$S_N = \sqrt{\frac{2}{N}} \left( c(k) \times \cos\left(\frac{(2 \times j + 1) \times k\pi}{2 \times N}\right) \right)_{j,k \in [0, N-1]},$$

with k an integer k≥0, $$c(k) = \begin{cases} \frac{1}{\sqrt{2}} & \text{if } k = 0 \\ 1 & \text{if } k > 0 \end{cases},$$

wherein said 1D inverse transform of said transformed residual block is performed by using butterfly operations converting from a spatial domain to a transform domain a sample vector of size 3, said sample vector being based on samples of a row or a column of said transformed residual block, wherein said butterfly operations are represented by:

$E_1 = x_1 + x_3,$ $E_2 = x_1 - x_3,$ $t_1 = (E_1 + x_2) \times A_3(1,1),$ $t_2 = E_2 \times A_3(2,1),$ $t_3 = E_1 \times A_3(3,1) - x_2,$ where $$\begin{bmatrix} x_1 \\ x_2 \\ x_3 \end{bmatrix}$$

represents said sample vector of size 3 from said spatial domain, $$\begin{bmatrix} t_1 \\ t_2 \\ t_3 \end{bmatrix}$$

represents a resulting sample vector of size 3 from said transform domain, $E_1$ and $E_2$ represent intermediate values for butterfly design used for computing samples from said transform domain, $A_3(k,j)$ represent multiplicative factors;
determine a predicted block for said at least one block; and
reconstruct said at least one block from said inverse transformed residual block and said predicted block.

18. The apparatus according to claim 16, wherein N is a multiple of 3.

19. The apparatus according to claim 18, wherein said butterfly operations implement a transform matrix of size 3×3, said sample vector comprising:
samples of a row or a column of said residual block along said one dimension in the case where N equals 3, and
linear combinations of samples of a row or a column of said residual block taken along said one dimension in the case where N is higher than 3.

20. The apparatus according to claim 16, said one or more processors further configured to, for N>3:
perform butterfly operations converting from a spatial domain to a transform domain a sample vector of size N/2, wherein said butterfly operations implement a complementary matrix transform $X_N$ represented by:

$$X_N = \cos\left(\frac{(2j+1) \times (2k+1)\pi}{2N}\right)_{k,j \in [0,N/2]}.$$

21. The apparatus according to claim 17, wherein N is a multiple of 3.

22. The apparatus according to claim 21, wherein said butterfly operations implement a transform matrix of size 3×3, said sample vector comprising:
samples of a row or a column of said transformed residual block along said at least one dimension in the case where N equals 3, and
linear combinations of samples of a row or a column of said transformed residual block taken along said at least one dimension in the case where N is higher than 3.

23. The apparatus according to claim 17, wherein said one or more processors are further configured to, for N>3:
perform butterfly operations converting from a transform domain to a spatial domain a sample vector of size N/2, wherein said butterfly operations implement a complementary matrix transform $X_N$ represented by:

$$X_N = \cos\left(\frac{(2j+1) \times (2k+1)\pi}{2N}\right)_{k,j \in [0,N/2]}.$$

* * * * *

UNITED STATES PATENT AND TRADEMARK OFFICE
CERTIFICATE OF CORRECTION

PATENT NO. : 10,735,732 B2
APPLICATION NO. : 16/336439
DATED : August 4, 2020
INVENTOR(S) : Fabrice Leleannec et al.

It is certified that error appears in the above-identified patent and that said Letters Patent is hereby corrected as shown below:

In the Claims

Column 30, Line 67, Claim 12, "v3=E2+E3" should read --v3 =-E2+E3--.

Signed and Sealed this
Twenty-third Day of January, 2024

Katherine Kelly Vidal
*Director of the United States Patent and Trademark Office*